(12) United States Patent
Hamamoto et al.

(10) Patent No.: US 7,537,852 B2
(45) Date of Patent: May 26, 2009

(54) COMPOSITE ION EXCHANGE MEMBRANE AND ELECTROLYTE MEMBRANE ELECTRODE ASSEMBLY

(75) Inventors: Shiro Hamamoto, Otsu (JP); Satoshi Takase, Otsu (JP); Yoshimitsu Sakaguchi, Otsu (JP); Shigenori Nagahara, Otsu (JP); Kota Kitamura, Otsu (JP); Junko Nakao, Otsu (JP); Kousuke Sasai, Otsu (JP)

(73) Assignee: Toyo Boseki Kabushiki Kaisha, Osaka-shi (JP)

( * ) Notice: Subject to any disclaimer, the term of this patent is extended or adjusted under 35 U.S.C. 154(b) by 586 days.

(21) Appl. No.: 10/503,926

(22) PCT Filed: Feb. 3, 2003

(86) PCT No.: PCT/JP03/01080

§ 371 (c)(1),
(2), (4) Date: Aug. 10, 2004

(87) PCT Pub. No.: WO03/068853

PCT Pub. Date: Aug. 21, 2003

(65) Prior Publication Data

US 2005/0095486 A1    May 5, 2005

(30) Foreign Application Priority Data

Feb. 15, 2002  (JP) ............................. 2002-038891
Apr. 16, 2002  (JP) ............................. 2002-113684
Oct. 7, 2002   (JP) ............................. 2002-293968
Oct. 7, 2002   (JP) ............................. 2002-293969
Oct. 7, 2002   (JP) ............................. 2002-293970
Oct. 17, 2002  (JP) ............................. 2002-303288

(51) Int. Cl.
*H01M 8/10*       (2006.01)

(52) U.S. Cl. .................. 429/33; 429/44; 428/308.4
(58) Field of Classification Search .............. 429/30, 429/33, 44; 428/308.4
See application file for complete search history.

(56) References Cited

U.S. PATENT DOCUMENTS 4,359,567 A    11/1982   Evers .................... 528/179

(Continued)

FOREIGN PATENT DOCUMENTS

EP         0875524 A2    11/1998

(Continued)

OTHER PUBLICATIONS

Japan Patent Office; Notice of Grounds of Rejection, mailed Mar. 3, 2005, in Japanese Patent Application No. 2002-377514.

(Continued)

*Primary Examiner*—Stephen J. Kalafut
(74) *Attorney, Agent, or Firm*—Kenyon & Kenyon LLP

(57) ABSTRACT

The present invention provides a composite ion exchange membrane which has high mechanical strength and is suitable for use as a solid polymer electrolyte membrane excellent in ionic conductivity and a method for its production. The invention is achieved by a composite ion exchange membrane including a composite layer comprising a support membrane with continuous voids formed of polybenzazole polymer, the support membrane being impregnated with ion exchange resin, and surface layers formed of ion exchange resin free of support membranes, the surface layers being formed on both surfaces of the composite layer so as to sandwich the composite layer therebetween.

15 Claims, 3 Drawing Sheets

U.S. PATENT DOCUMENTS

| | | | |
|---|---|---|---|
| 4,533,692 A | 8/1985 | Wolfe et al. | 524/417 |
| 4,533,693 A | 8/1985 | Wolfe et al. | 524/417 |
| 4,533,724 A | 8/1985 | Wolfe et al. | 528/313 |
| 4,578,432 A | 3/1986 | Tsai et al. | 525/432 |
| 4,703,103 A | 10/1987 | Wolfe et al. | 528/179 |
| 5,654,109 A | 8/1997 | Plowman et al. | |
| 5,998,057 A | 12/1999 | Koschany et al. | 429/42 |
| 6,176,984 B1* | 1/2001 | Narang et al. | 204/296 |
| 6,248,469 B1* | 6/2001 | Formato et al. | 429/41 |
| 6,902,801 B2* | 6/2005 | Charnock et al. | 428/320.2 |
| 6,977,009 B2* | 12/2005 | Pan et al. | 96/13 |

FOREIGN PATENT DOCUMENTS

| | | |
|---|---|---|
| JP | 04-329264 A | 11/1992 |
| JP | 08-162132 | 6/1996 |
| JP | 2000-273214 | 10/2000 |
| JP | 2000-513480 A | 10/2000 |
| JP | 2001-035508 | 2/2001 |
| JP | 2001-157823 | 6/2001 |
| JP | 2002-203576 | 7/2002 |
| JP | 2002-324559 | 11/2002 |
| JP | 2004-193089 A | 7/2004 |
| WO | WO 91/16123 A | 10/1991 |
| WO | WO 98/14505 | 4/1998 |
| WO | WO 99/10165 | 3/1999 |
| WO | WO 00/22684 | 4/2000 |
| WO | 01-18894 A2 | 3/2001 |
| WO | WO 02/03489 | 1/2002 |

OTHER PUBLICATIONS

Japan Patent Office; Notice of Grounds of Rejection, mailed May 19, 2005, in Japanese Patent Application No. 2002-377513.

European Patent Office, Supplemental European Search Report under Article 153(7) EPC in corresponding European Patent Application No. 03703150.7, dated Feb. 25, 2009.

* cited by examiner

COMPOSITE ION EXCHANGE MEMBRANE AND ELECTROLYTE MEMBRANE ELECTRODE ASSEMBLY

This application is a 371 national phase application of PCT/JP03/01080 filed on 3 Feb. 2003, claiming priority to JP 2002-038891, filed on 15 Feb. 2002, JP 2002-113684 filed 16 Apr. 2002, JP 2002-293968 filed 7 Oct. 2002, JP 2002-293970 filed 7 Oct. 2002, and JP 2002-303288 filed 17 Oct. 2002, the contents of which are incorporated herein by reference in their entirety.

TECHNICAL FIELD

The present invention relates to a composite ion exchange membrane superior in mechanical strength and ionic conductivity and, particularly, to a solid polymer electrolyte membrane and an electrolyte membrane-electrode assembly.

BACKGROUND ART

In late years much attention has been focused on novel power generating techniques which are superior in energy efficiency or environmental friendliness. In particular, solid polymer fuel cells using solid polymer electrolyte membranes are characterized as exhibiting high energy density and being started and stopped more easily than fuel cells of other systems due to their lower operating temperature. Therefore, they are on development as generators for electric motorcars, dispersed power generation and the like. In addition, development of direct methanol fuel cells which use solid polymer electrolyte membranes and into which methanol is supplied directly as fuel are underway for applications such as electric sources of portable devices. Proton-conducting ion exchange resin films are usually used for solid polymer electrolyte membranes. Solid polymer electrolyte membranes are required to have characteristics such as fuel permeation inhibitability and mechanical strength preventing permeation such as hydrogen of fuel is necessary for a solid polymer electrolyte membrane as well as proton conductivity. As such a solid polymer electrolyte membrane, for example, per fluorocarbon sulfonic acid polymer membranes in which sulfonic acid groups are introduced, typified by Nafion (commercial name) manufactured by Du Pont, U.S.A., are known.

In order to enhance output power and efficiency of solid polymer fuel cells, it is effective to reduce the ion conduction resistance of solid polymer electrolyte membranes. One of the measures for it is to reduce the thickness of membranes. For solid polymer electrolyte membranes typified by Nafion, reduction of membrane thickness has been attempted. However, those membranes have problems in that when the thickness is reduced, the mechanical strength decreases and, as a result, when a solid polymer electrolyte membrane and an electrode are bonded together by hot pressing, the membrane easily ruptures or, due to the change of dimensions of the membrane, the electrode bonded to the solid polymer electrolyte membrane peels off, resulting in lowering of electric power generation characteristics. Moreover, they have problems in that the reduction of the thickness results in lowering of the fuel permeation inhibitability, which reduces electromotive force or efficiency for fuel utilization.

Moreover, solid polymer electrolyte membranes can be applied for a wide variety of applications including, in addition to an application as an ion exchange resin membrane of fuel cells shown above, applications in the field of electrochemistry such as electrolytic applications e.g. alkali electrolysis and production of hydrogen from water and electrolyte applications in various types of cells e.g. lithium cells and nickel hydrogen cells; mechanical functional material applications such as micro actuators and artificial muscles, applications for functional materials for recognizing/responding to ions, molecules and the like; and applications for functional materials for separation/purification. It is conceivable that, in each application, new, superior functions will be offered by increasing the strength of solid polymer electrolyte membranes or reducing the thickness thereof. As a method for improving the mechanical strength of a solid polymer electrolyte membrane and controlling its dimensional change, composite solid polymer electrolyte membranes resulting from combining solid polymer electrolyte membranes with various types of reinforcing materials have been proposed. Patent Document 1 discloses a composite solid polymer electrolyte membrane prepared by allowing a per fluorocarbon sulfonic acid polymer, which is an ion exchange resin, to soak into voids of a drawn porous polytetrafluoroethylene membrane and uniting them. However, these composite solid polymer electrolyte membranes have problems in that the reinforcing material is easily softened by the heat generated during electric power generation because it is made of polytetrafluoroethylene and, therefore, the membrane tends to change in dimension due to creep, that when the reinforcing material is impregnated with per fluorocarbon sulfonic acid polymer solution and then dried, the capacity of the voids in the reinforcing material causes almost no change and, therefore, the per fluorocarbon sulfonic acid polymer solidified in the voids of the reinforcing material tends to be unevenly distributed, that to fill the voids completely with the polymer requires a complicated process such as repeating twice or more the process of impregnation with the ion exchange resin solution and drying, and that it is difficult to obtain a membrane with a superior fuel permeation inhibitability because voids tend to remain. Patent Document 2 discloses a composite solid polymer electrolyte membrane in which fibrillated polytetrafluoroethylene as a reinforcing material is dispersed in a membrane made of per fluorocarbon sulfonic acid polymer. However, the composite solid polymer electrolyte membrane has a problem in that delamination of the electrodes occurs because the membrane can not exhibit sufficient mechanical strength and therefore the deformation of the membrane can not be controlled because the membrane has a structure where the reinforcing material is discontinuous. Moreover, Patent Document 3 discloses an electrolyte whose creep elongation at high temperatures is reduced through improvement in heat resistance achieved by crosslinking side chains multifunctionalized. However, the creep elongation of the electrolyte in Patent Document 3 is defined based on a deformation occurring during a very short time as short as four minutes and there is no discussion about the effect of moisture. When it is exposed to a high temperature, humidified atmosphere for a long period of time, lowering of heat resistance caused by decomposition of the side chain crosslinking structure introduced or deformation caused by relaxation of a secondary structure of a main chain are unavoidable. Therefore, a measure such as that described in Patent Document 3 has a problem in that no electrolyte can be achieved which exhibits a small creep deformation under a load applied for a long period of time under a high temperature, humidified atmosphere important for practical use of solid polymer fuel cells.

Polybenzazole polymers such as polybenzooxazole (PBO) and polybenzimidazole (PBI) are expected to be suitable as a reinforcing material of solid polymer electrolyte membranes because they are superior as having a high heat resistance, a high strength and a high elastic modulus Patent Document 4 discloses solid polymer electrolyte membranes in which a PBO porous membrane is combined with various types of ion exchange resin. However, it has problems in that on both surfaces of a PBO porous membrane obtained by a method including solidifying, directly in a water bath, a PBO solution film formed from a dope which exhibits mesomorphism such as that disclosed in that document, dense layers having less apertures are formed; when the membrane is combined with ion exchange resin, an ion exchange resin solution is difficult to be soaked into the membrane, resulting in a low content of the ion exchange resin in a composite membrane, and characteristics such as ionic conductivity inherent to the ion exchange resin are greatly deteriorated. Moreover, the composite ion exchange membrane disclosed in this document is not particularly restricted with respect to the formation or thickness of surface ion exchange resin layers. However, the presence and thickness of surface layers in a composite ion exchange membrane have an effect on adhesion between an ion exchange resin serving as a binder and an ion exchange resin forming solid polymer electrolyte membranes and it is important to optimally control them.

Patent Document 5 discloses a method for manufacturing a polymer film for fuel cells, in the film an acid being trapped in voids of a PBI porous membrane. However, a film trapping a free acid therein obtained by a method such as that described in this document has problems in that its ionic conductivity in a low temperature range such as that up to 100° C. is lower than that of ion exchange resin membranes such as the aforementioned Nafion and that the acid tends to exude. Moreover, Patent Document 6 discloses a method for obtaining a polybenzazole film by forming a film from an optically anisotropic polybenzazole polymer solution and solidifying the film through a process of rendering isotropic. However, a polybenzazole film obtained by a method such as that disclosed in this document is a transparent and highly dense film, which is not suitable for the purpose of converting it to an ion exchange membrane by impregnating it with ion exchange resin.

[Patent Document 1]
Japanese Patent Laying-Open No. 8-162132
[Patent Document 2]
Japanese Patent Laying-Open No. 2001-35508
[Patent Document 3]
Japanese Patent Laying-Open No. 2002-324559
[Patent Document 4]
Pamphlet of International Publication No. WO00/22684
[Patent Document 5]
Pamphlet of International Publication No. WO98/14505
[Patent Document 6]
Japanese Patent Laying-Open No. 2000-273214

The present invention provides a composite ion exchange membrane which has high mechanical strength and is suitable for use as a solid polymer electrolyte membrane excellent in ionic conductivity and a method for its production and, furthermore, an electrolyte membrane-electrode assembly having good adhesion between the electrolyte membrane and the electrode assembly.

DISCLOSURE OF THE INVENTION

The present invention provides a composite ion exchange membrane including a composite layer comprising a support membrane with continuous voids formed of polybenzazole polymer, the support layer being impregnated with ion exchange resin, and surface layers formed of ion exchange resin free of support membranes, the surface layers being formed on both surfaces of the composite layer so as to sandwich the composite layer there between. Moreover, the present invention also provides a composite ion exchange membrane including a composite layer comprising a support membrane with continuous voids formed of polybenzazole polymer, the support layer being impregnated with ion exchange resin, and surface layers formed of ion exchange resin free of support membranes, the surface layers being formed on both surfaces of the composite layer so as to sandwich the composite layer there between, wherein at least one surface of the support membrane has an open area ratio of 40% or more. Moreover, the present invention provides a composite ion exchange membrane including a composite layer comprising a support membrane with continuous voids formed of polybenzazole polymer, the support layer being impregnated with ion exchange resin, and surface layers formed of ion exchange resin free of support membranes, the surface layers being formed on both surfaces of the composite layer so as to sandwich the composite layer there between, wherein the composite ion exchange membrane exhibits an creep elongation of up to 50% when it is applied with a load of 1 MPa for two hours under a dry atmosphere at 130° C. Moreover, the present invention provides a composite ion exchange membrane including a composite layer comprising a support membrane with continuous voids formed of polybenzazole polymer, the support layer being impregnated with ion exchange resin, and surface layers formed of ion exchange resin free of support membranes, the surface layers being formed on both surfaces of the composite layer so as to sandwich the composite layer there between, wherein the composite ion exchange membrane exhibits a creep elongation in high temperature water of up to 60% when it is applied with a load of 1 MPa for two hours in water at 130° C. Moreover, the present invention provides a method for producing a support membrane, the method comprising forming a polybenzazole polymer solution into a film form and then solidifying it, wherein the polybenzazole polymer solution is an isotropic solution containing the polybenzazole polymer in an amount of from 0.5% by weight to 2% by weight. Furthermore, the present invention provides an electrolyte membrane-electrode assembly comprising a composite ion exchange membrane including a composite layer comprising a support membrane with continuous voids formed of polybenzazole polymer, the support layer being impregnated with ion exchange resin, and surface layers formed of ion exchange resin free of support membranes, the surface layers being formed on both surfaces of the composite layer so as to sandwich the composite layer there between, wherein catalyst layers and gas diffusion layers are disposed on both surfaces of the composite ion exchange membrane.

The polybenzazole polymer used as the support membrane of the present invention refers to polymers having a structure containing an oxazole ring, a thiazole ring and an imidazole ring in the polymer chain and specifically to polymers containing a repeating unit represented by the following general formulas in the polymer chain.

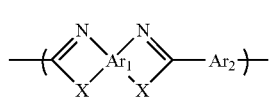

(Chemical Formula 1-1)

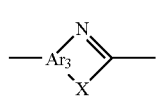

(Chemical Formula 1-2)

Here, $Ar_1$, $Ar_2$ and $Ar_3$ each represent an aromatic unit, which may have a substituent such as various types of aliphatic group, aromatic group, halogen group, hydroxyl group, nitro group, cyano group and trifluoromethyl group. These aromatic units may be monocyclic units such as benzene ring, condensed ring units such as naphthalene, anthracite and pyrene, and polycyclic aromatic units in which such aromatic units are linked via two or more arbitrary bonds. The positions of N and X in aromatic units are not particularly restricted if a configuration such that a benzazole ring can be formed is established. Moreover, these may be heterocyclic aromatic units containing N, O, S or the like in aromatic rings as well as hydrocarbon aromatic units. X represents O, S and NH.

The aforementioned $Ar_1$ is preferably ones represented by the following general formulas.

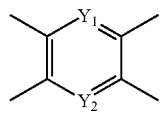

(Chemical Formula 2-1)

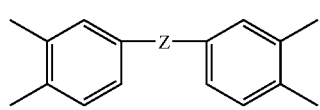

(Chemical Formula 2-2)

Here, $Y_1$ and $Y_2$ each represent CH or N, and Z represents a direct bond, —O—, —S—, —SO$_2$—, —C(CH$_3$)$_2$—, —C(CF$_3$)$_2$— and —CO—.

The aforementioned Ar2 is preferably one which is represented by the following general formulas.

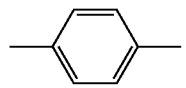

Chemical Formula 3-1

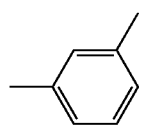

Chemical Formula 3-2

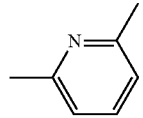

Chemical Formula 3-3

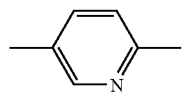

Chemical Formula 3-4

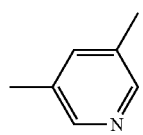

Chemical Formula 3-5

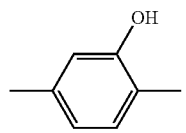

Chemical Formula 3-6

-continued

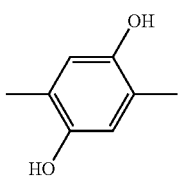

Chemical Formula 3-7

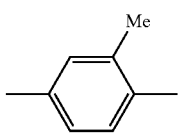

Chemical Formula 3-8

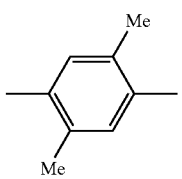

Chemical Formula 3-9

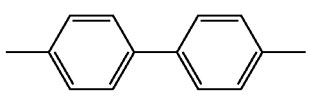

Chemical Formula 3-10

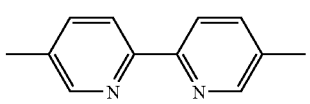

Chemical Formula 3-11

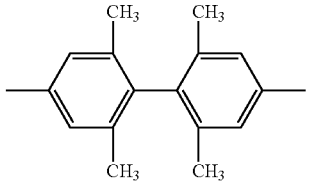

Chemical Formula 3-12

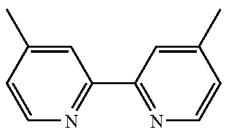

Chemical Formula 3-13

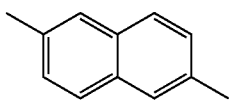

Chemical Formula 3-14

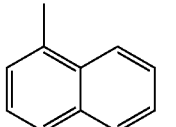

ChemicalFormula 3-15

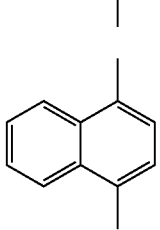

Chemical Formula 3-16

Chemical Formula 3-17

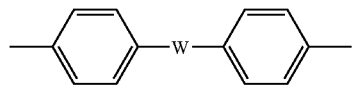

Chemical Formula 3-18

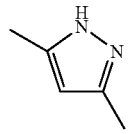

Chemical Formula 3-19

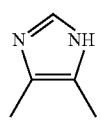

Chemical Formula 3-20

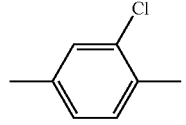

Chemical Formula 3-21

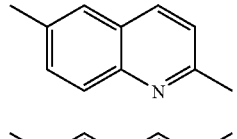

Chemical Formula 3-22

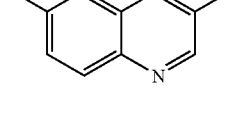

Here, W represents —O—, —S—, —SO$_2$—, —C(CH$_3$)$_2$—, —C(CH$_3$)$_2$— and —CO—.

The aforementioned Ar$_3$ is preferably one which is represented by the following general formula.

(Chemical Formula 4)

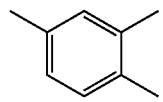

These polybenzazole polymers may be homopolymers having the foregoing repeating units. Alternatively, they also may be random, alternating or block copolymers comprising a combination of the abovementioned structural units, examples of which include those disclosed in U.S. Patent Nos. 4703103, 4533692, 4533724, 4533693, and 4578432.

Specific examples of such polybenzazole structural units include ones represented by the following structural formulas.

Chemical Formula 5-1

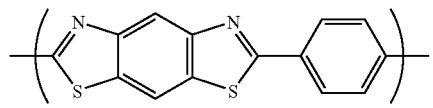

Chemical Formula 5-2

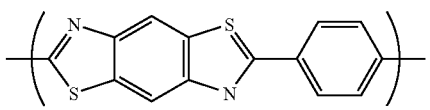

Chemical Formula 5-3

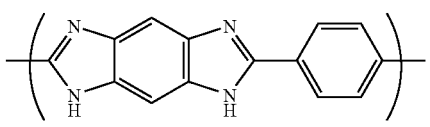

Chemical Formula 5-4

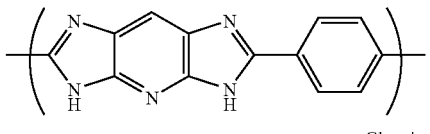

Chemical Formula 5-5

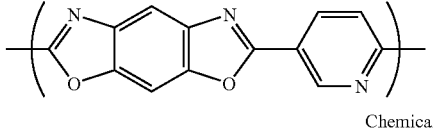

Chemical Formula 5-6

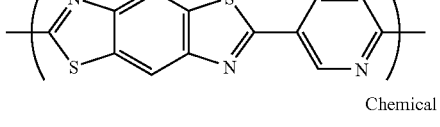

Chemical Formula 5-7

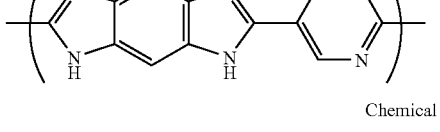

Chemical Formula 5-8

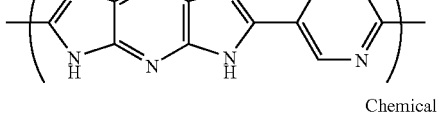

Chemical Formula 6-1

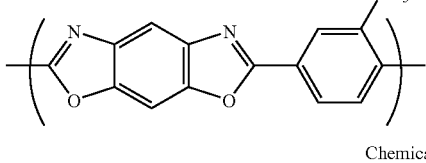

Chemical Formula 6-2

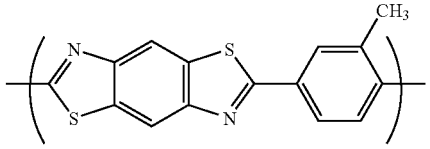

Chemical Formula 6-3

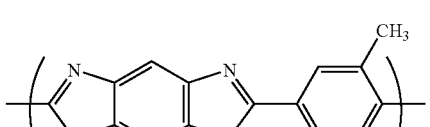

-continued
Chemical Formula 6-4
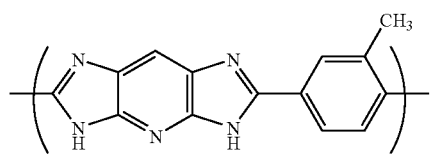
Chemical Formula 6-5
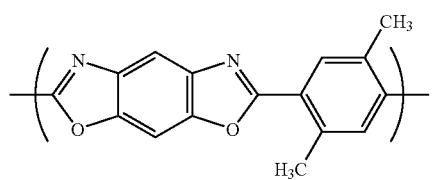
Chemical Formula 6-6
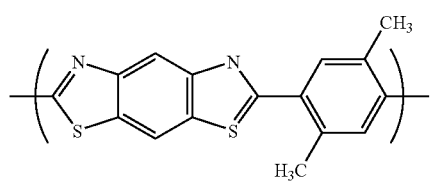
Chemical Formula 6-7
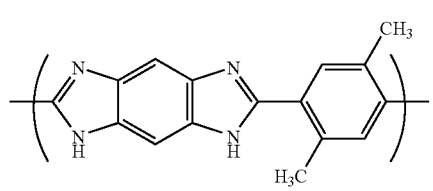
Chemical Formula 6-8
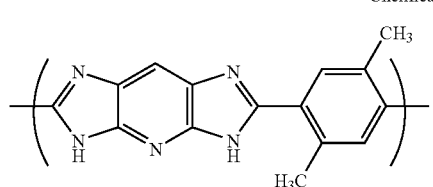
Chemical Formula 7-1
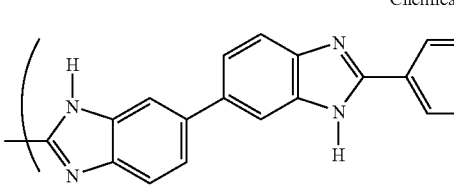
Chemical Formula 7-2
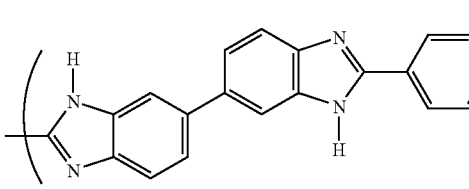
Chemical Formula 7-3
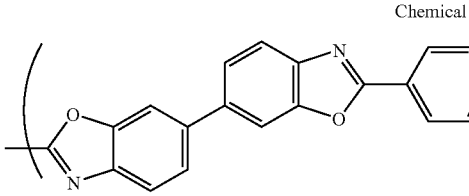
-continued
Chemical Formula 7-4
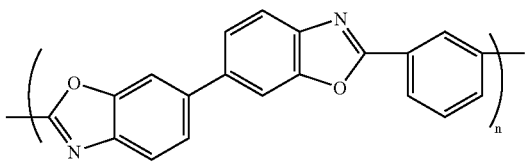
Chemical Formula 7-5
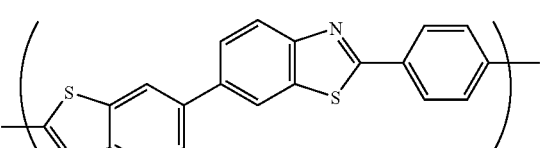
Chemical Formula 7-6
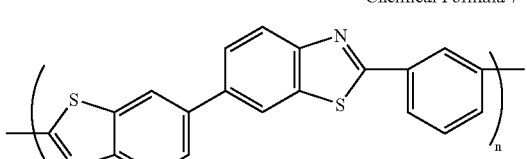
Chemical Formula 7-7
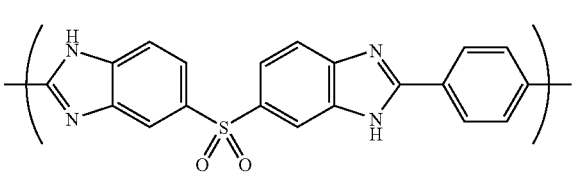
Chemical Formula 7-8
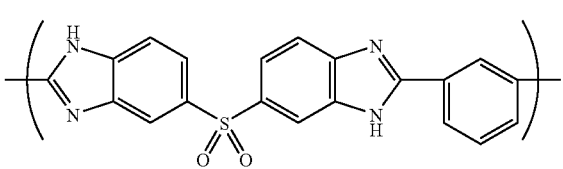
Chemical Formula 7-9
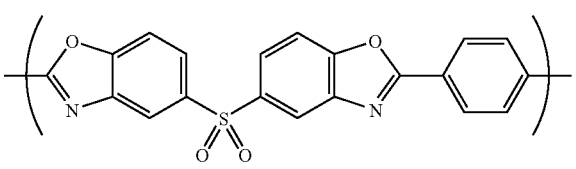
Chemical Formula 7-10
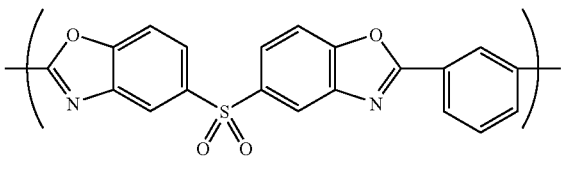
Chemical Formula 7-11
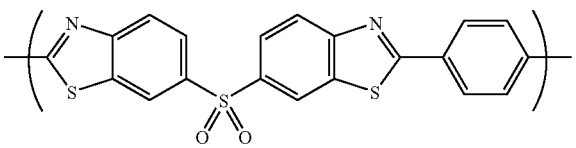

-continued
Chemical Formula 7-12
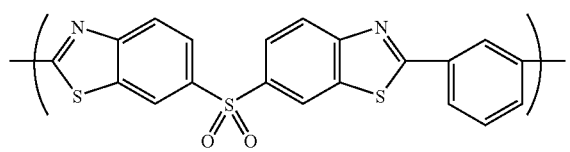
Chemical Formula 8-1
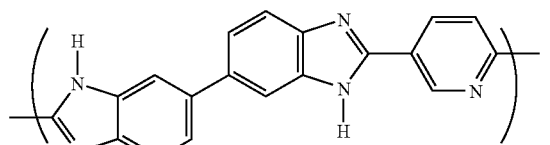
Chemical Formula 8-2
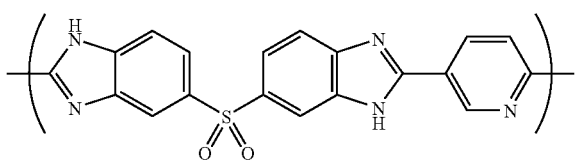
Chemical Formula 8-3
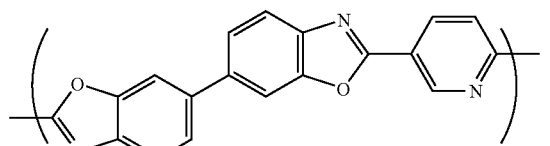
Chemical Formula 8-4
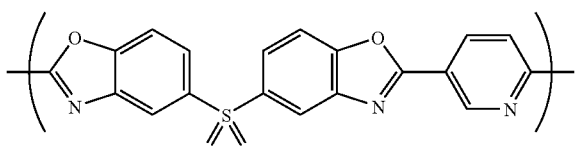
Chemical Formula 8-5
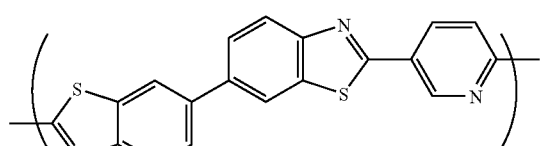
Chemical Formula 8-6
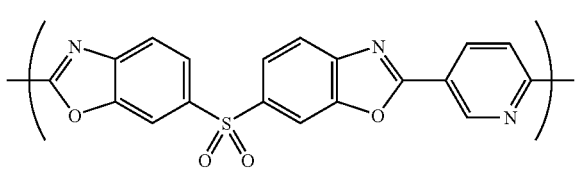
Chemical Formula 8-7
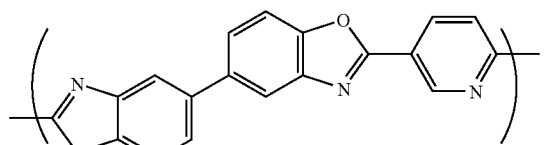
-continued
Chemical Formula 8-8
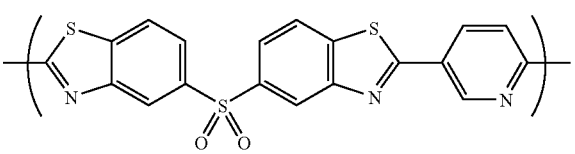
Chemical Formula 9-1
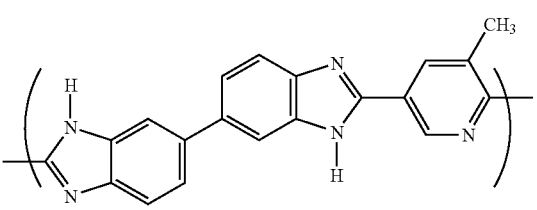
Chemical Formula 9-2
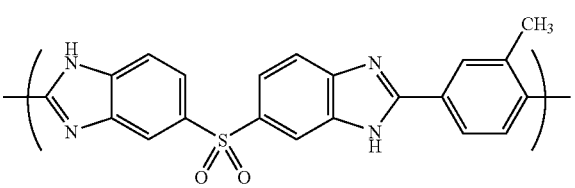
Chemical Formula 9-3
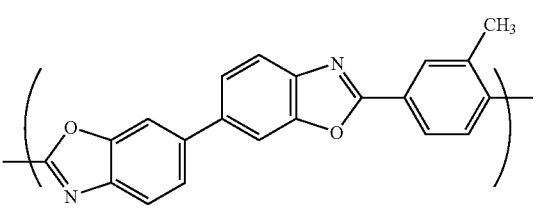
Chemical Formula 9-4
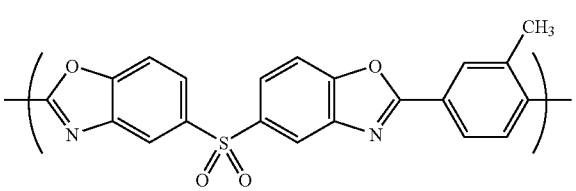
Chemical Formula 9-5
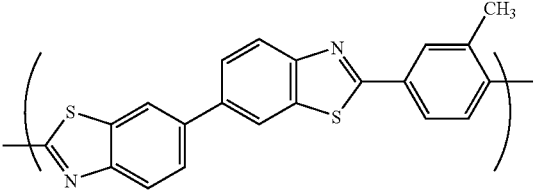
Chemical Formula 9-6
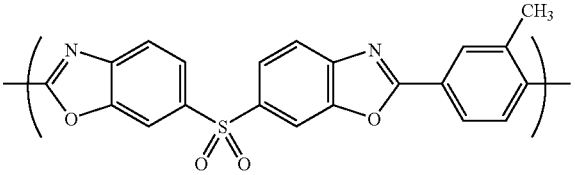

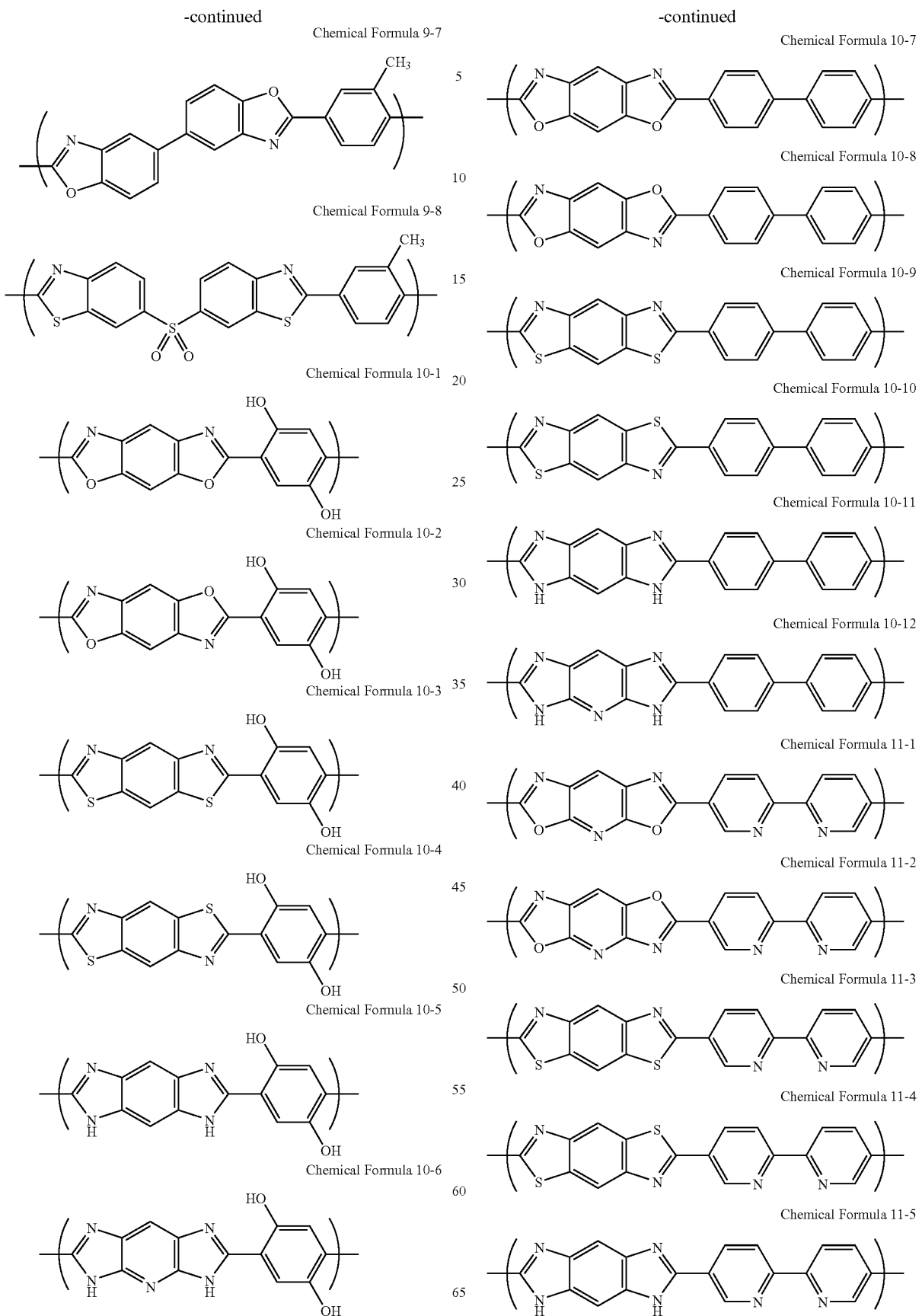

-continued

Chemical Formula 11-6

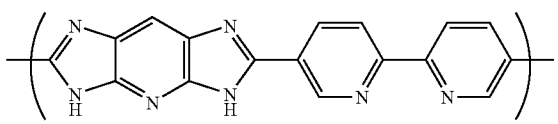

Chemical Formula 11-7

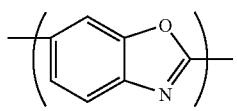

Chemical Formula 11-8

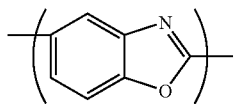

Chemical Formula 11-9

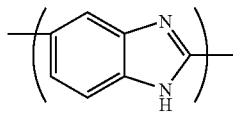

Chemical Formula 11-10

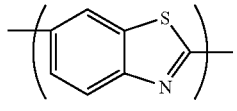

Chemical Formula 11-11

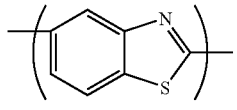

In addition, not only these polybenzazole structural units, but also random, alternating or block copolymers with additional polymer structural units are available. In such a situation, the additional polymer structural units are preferably chosen from aromatic polymer structural units with superior heat resistance. Specific examples include polyimide structural units, polyamide structural units, polyamideimide structural units, polyoxydiazole structural units, polyazomethine structural units, polybenzazoleimide structural units, polyetherketone structural units and polyethersulfone structural units.

Examples of the polyimide structural units include ones represented by the following general formula.

(Chemical Formula 12)

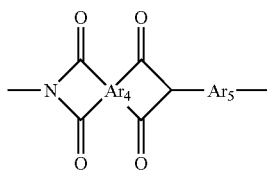

Here, $Ar_4$ is represented by a tetravalent aromatic unit. Preferred are those represented by the following structures.

Chemical Formula 13-1

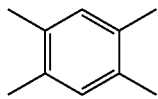

Chemical Formula 13-2

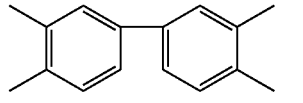

Chemical Formula 13-3

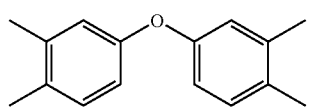

Chemical Formula 13-4

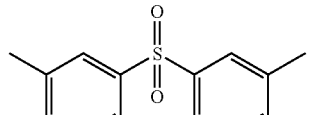

Chemical Formula 13-5

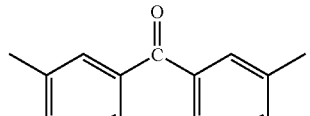

Chemical Formula 13-6

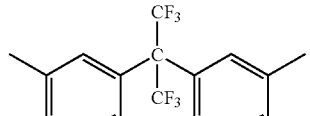

Chemical Formula 13-7

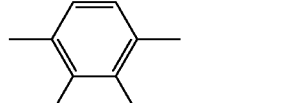

Chemical Formula 13-8

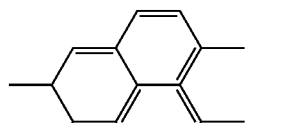

$Ar_5$ is a divalent aromatic unit and preferred are those represented by the following structures. On the aromatic rings shown here, various kinds of substituents may be present such as a methyl group, a methoxy group, a halogen group, a trifluoromethyl group, a hydroxyl group, a nitro group and a cyano group.

Chemical Formula 14-1

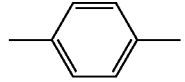

Chemical Formula 14-2

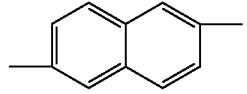

Chemical Formula 14-3

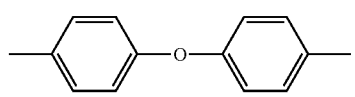

-continued

Chemical Formula 14-4

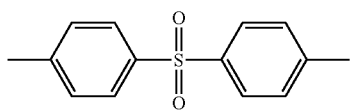

Chemical Formula 14-5

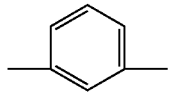

Chemical Formula 14-6

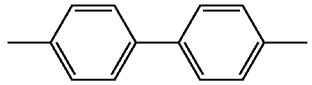

Chemical Formula 14-7

Chemical Formula 14-8

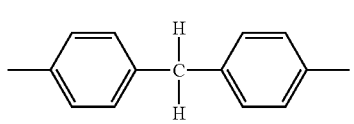

Specific examples of these polyimide structural units include ones represented by the following structural formulas.

Chemical Formula 15-1

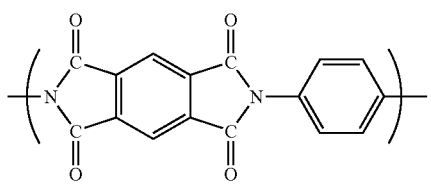

Chemical Formula 15-2

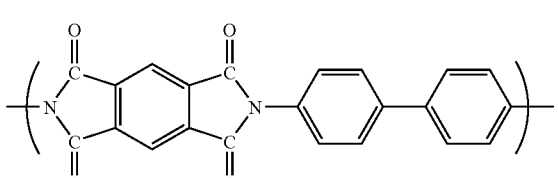

Chemical Formula 15-3

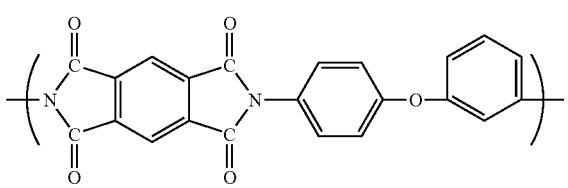

Chemical Formula 15-4

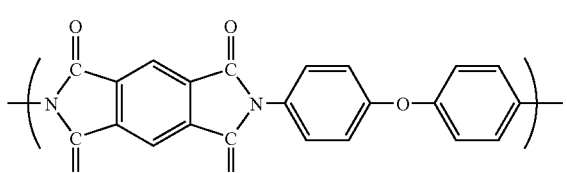

Chemical Formula 15-5

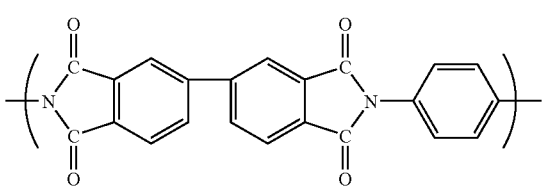

Chemical Formula 15-6

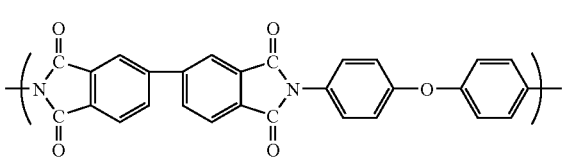

Chemical Formula 15-7

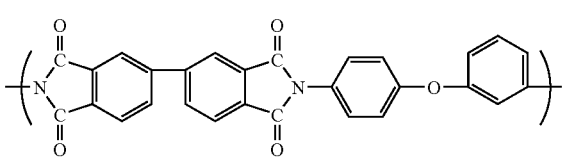

Chemical Formula 15-8

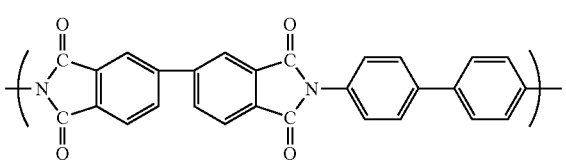

Chemical Formula 16-1

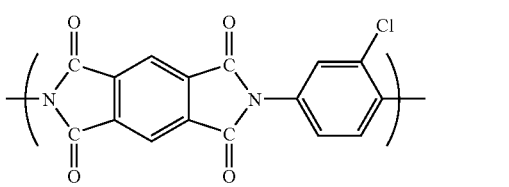

Chemical Formula 16-2

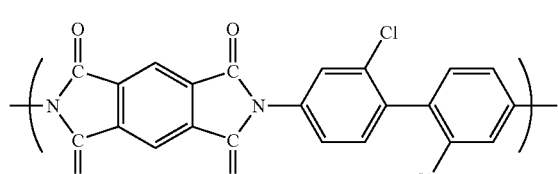

Chemical Formula 16-3

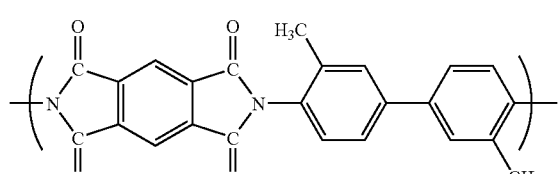

Chemical Formula 16-4

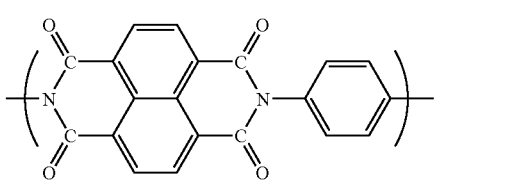

-continued

Chemical Formula 16-5

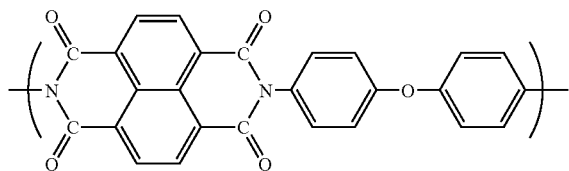

Examples of polyamide structural units include ones represented by the following structural formulas.

(Chemical Formula 17-1)

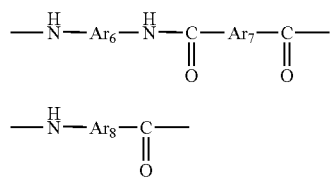

(Chemical Formula 17-2)

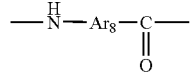

Here, $Ar_6$, $Ar_7$ and $Ar_8$ are preferably each independently one which is chosen from the following structures. On the aromatic rings shown here, various kinds of substituents may be present such as a methyl group, a methoxy group, a halogen group, a trifluoromethyl group, a hydroxyl group, a nitro group and a cyano group.

Chemical Formula 18-1

Chemical Formula 18-1

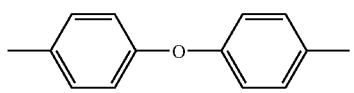

Chemical Formula 18-3

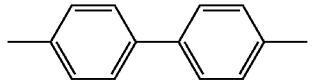

Chemical Formula 18-4

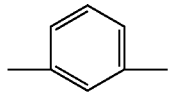

Chemical Formula 18-5

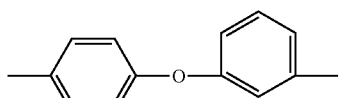

Chemical Formula 18-6

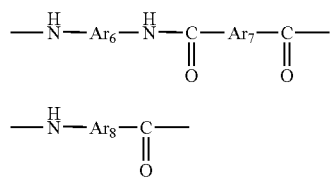

Specific examples of these polyamide structural units include ones represented by the following structural formulas.

Chemical Formula 19-1

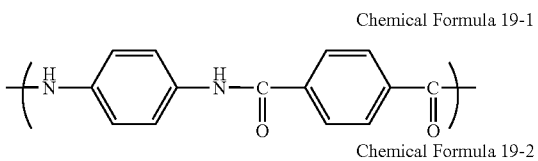

Chemical Formula 19-2

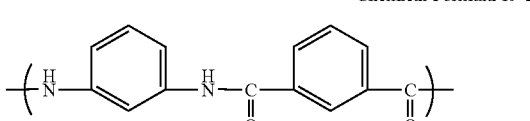

Chemical Formula 19-3

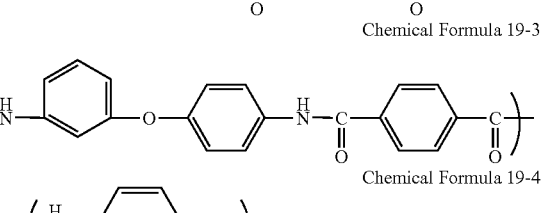

Chemical Formula 19-4

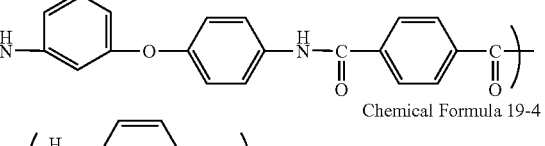

Examples of polyamideimide structural units include ones represented by the following structural formulas.

(Chemical Formula 20)

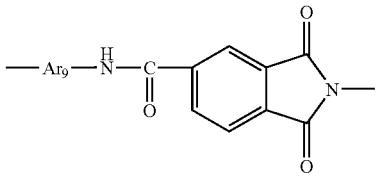

Here, $Ar_9$ is preferably chosen from the structures provided above as specific examples of $Ar_5$.

Specific examples of these polyamideimide structural units include ones represented by the following structural formulas.

Chemical Formula 21-1

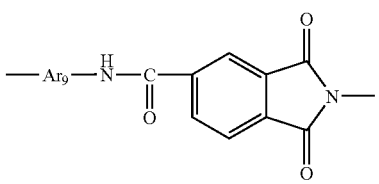

Chemical Formula 21-2

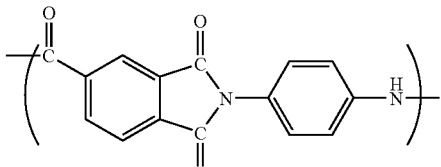

Examples of polyoxydiazole structural units include ones represented by the following structural formulas.

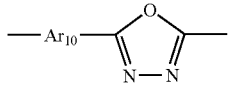
(Chemical Formula 22)

Here, $Ar_{10}$ is preferably chosen from the structures provided above as specific examples of $Ar_5$.

Specific examples of such polyoxydiazole structural units include ones represented by the following structural formulas.

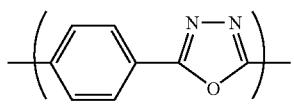
Chemical Formula 23-1

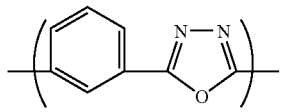
Chemical Formula 23-2

Examples of polyazomethine structural units include ones represented by the following structural formulas.

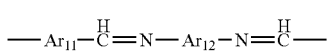
(Chemical Formula 24)

Here, $Ar_{11}$ and $Ar_{12}$ are preferably chosen from the structures provided above as specific examples of $Ar_6$.

Specific examples of these polyazomethine structural units include ones represented by the following structural formulas.

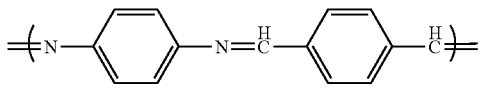
Chemical Formula 25-1

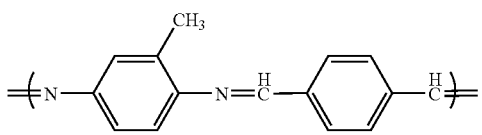
Chemical Formula 25-2

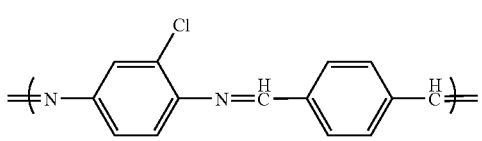
Chemical Formula 25-3

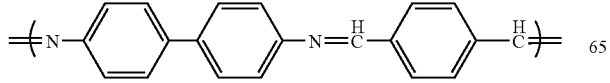
Chemical Formula 25-4

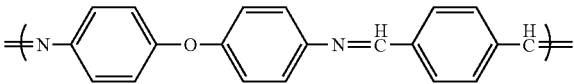
Chemical Formula 25-5

Examples of polybenzazoleimide structural units include ones represented by the following structural formulas.

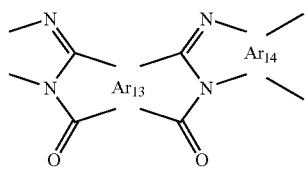
(Chemical Formula 26)

Here, $Ar_{13}$ and $Ar_{14}$ are preferably chosen from the structures provided above as specific examples of $Ar_4$.

Specific examples of such polybenzazoleimide structural units include ones represented by the following structural formulas.

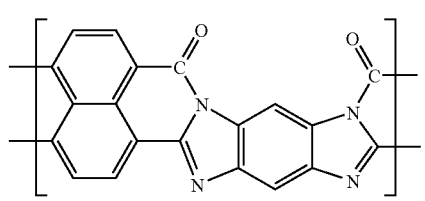
Chemical Formula 27-1

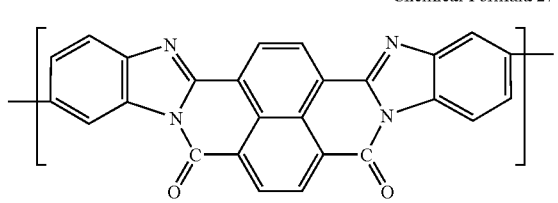
Chemical Formula 27-2

Polyetherketone structural units and polyethersulfone structural units are structural units generally having a structure in which aromatic units are combined via a ketone bond or a sulfone bond as well as an ether bond, which include structural components selected from the following structural formulas.

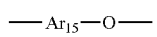
Chemical Formula 28-1

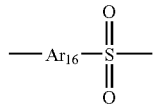
Chemical Formula 28-2

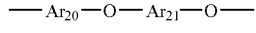
Chemical Formula 28-3

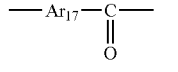
Chemical Formula 28-4

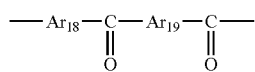
Chemical Formula 28-5

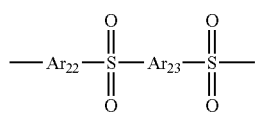
Chemical Formula 28-6

Here, $Ar_{15}$ through $Ar_{23}$ are preferably each independently ones represented by the following structures. On the aromatic rings shown here, various kinds of substituents may be present such as a methyl group, a methoxy group, a halogen group, a trifluoromethyl group, a hydroxyl group, a nitro group and a cyano group.

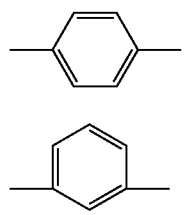

Chemical Formula 29-1

Chemical Formula 29-2

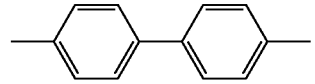
Chemical Formula 29-3

Chemical Formula 29-4

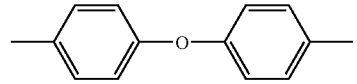
Chemical Formula 29-5

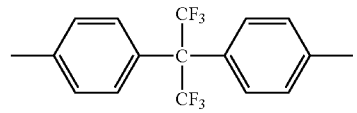
Chemical Formula 29-6

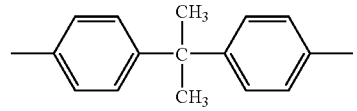
Chemical Formula 29-7

Specific examples of these polyetherketone structural units include ones represented by the following structural formulas.

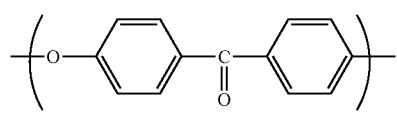
Chemical Formula 30-1

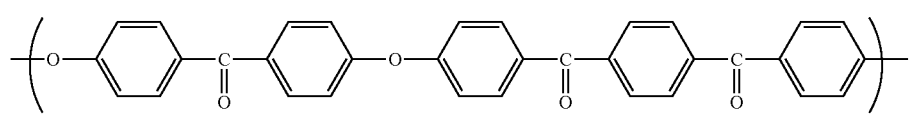
Chemical Formula 30-2

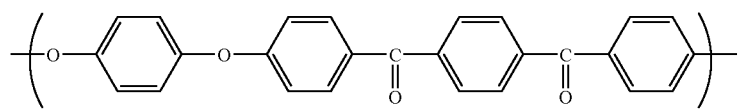
Chemical Formula 30-3

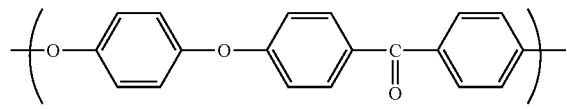
Chemical Formula 30-4

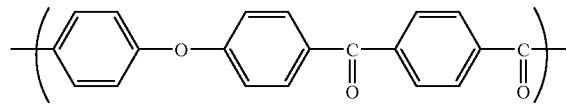
Chemical Formula 30-5

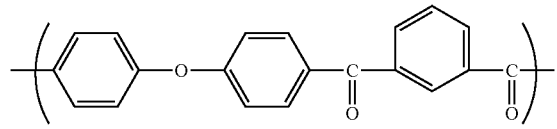
Chemical Formula 30-6

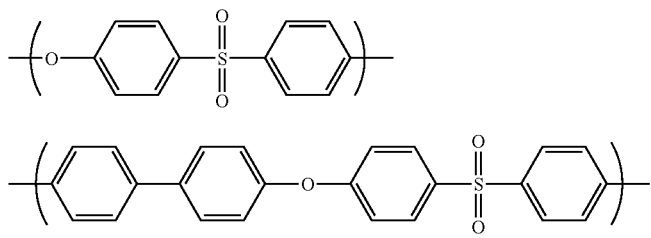

Chemical Formula 30-7

Chemical Formula 30-8

The aromatic polymer structural units which can be copolymerized together with these polybenzazole polymer structural units do not refer exactly to repeating units in polymer chains, but refer to structural units which can be present in polymer chains together with polybenzazole structural units. With respect to these copolymerizable aromatic polymer structural units, not only a single kind of units but also two or more kinds of units may be copolymerized in combination. Such copolymers can be synthesized by introducing amino groups, carboxyl groups, hydroxyl groups, halogen groups or the like at unit terminals formed of polybenzazole polymer structural units, followed by polymerizing the resultant as reaction components in the synthesis of those aromatic polymers, or introducing carboxyl groups at unit terminals of those aromatic polymer structural units, followed by polymerizing the resultant as reaction components in the synthesis of polybenzazole polymer.

The aforementioned polybenzazole polymer is obtained through condensation polymerization in polyphosphoric acid solvent. The degree of polymerization of the polymer, which is expressed using intrinsic viscosity, is from 15 dL/g to 35 dL/g, preferably from 20 dL/g to 26 dL/g. That below this range is unfavorable because a resulting support membrane have low strength. On the other hand, that over the range is also unfavorable because the concentration range of a polybenzazole polymer solution from which an isotropic solution can be formed is limited and it is difficult to form a film under isotropic conditions.

Methods available for forming a film of a polybenzazole polymer solution include, in addition to a film formation method, called the casting method, in which a polymer solution is cast on a substrate using a doctor blade or the like, any method in which a solution is formed into a film form, e.g. a method comprising extruding through a linear slit die, a method comprising blow extruding through circular slit die, a sandwich method comprising pressing a polymer solution sandwiched between two substrates through a roller, and spin coating. Preferred film formation methods suitable for the purpose of the present invention are the casting method and the sandwich method. As a substrate plate for the casting method or a substrate for the sandwich method, glass plates, metal plates, resin films and the like can be used. In addition, for the purpose of controlling the void structure of a support membrane at solidification, various types of porous material can be preferably employed as a substrate or substrate plate.

In order to obtain a support membrane which is uniform and which has a high porosity, it is important to form the polybenzazole polymer solution used in the present invention into a film at a composition under isotropic conditions. A preferred concentration range of the polybenzazole polymer solution is from 0.5% to 2%, more preferably from 0.8% to 1.5%. Concentrations lower than this range are unfavorable because the polymer solution comes to have a low viscosity and therefore film formation methods which can be applied are restricted and also because a resulting support membrane comes to have a small strength. On the other hand, concentrations higher than that range are unfavorable because no support membranes having high porosities are obtained and the solution exhibits anisotropy at some polymer compositions or degrees of polymerization of the polybenzazole polymer.

In order to adjust the concentration of the polybenzazole polymer solution within the above range, methods shown below can be employed. A method comprising separating polymer solid temporarily from a polymerized polybenzazole polymer solution and then adding solvent again to dissolve the solid, thereby adjusting the concentration. A method comprising adding solvent to a polymer solution resulting directly from condensation polymerization in polyphosphoric acid without separating polymer solid there from, thereby diluting the solution to adjust the concentration. A method comprising adjusting the polymerization composition of the polymer to obtain directly a polymer solution having a concentration within the aforementioned range.

Examples of solvents suitably used for adjusting the concentration of the polymer solution include methanesulfonic acid, dimethylsulfuric acid, polyphosphoric acid, sulfuric acid and trifluoroacetic acid. Mixed solvents comprising combinations of these solvents are also used. Above all, methanesulfonic acid and polyphosphoric acid are particularly preferred.

As a method for realizing the porous structure of the support membrane, a method is used which comprises contacting an isotropic polybenzazole polymer solution in a film form with a poor solvent to solidify it. The poor solvent is a solvent which is miscible with the solvent in the polymer solution. It may be either in a liquid phase or in a gas phase. In addition, a combination of solidification using a poor solvent in a gas phase and solidification using a poor solvent in a liquid phase can also be employed suitably. As the poor solvent to be used for the solidification, water, aqueous solutions of acids, aqueous solutions of inorganic salts, organic solvents such as alcohol, glycol and glycerin, and so on can be used. However, particular caution is required in choice of the poor solvent used for the solidification because in some combinations with the polybenzazole polymer solution to be used, problems will arise, for example, the support membrane comes to have a small surface open area ratio or a small porosity, or discontinuous voids are formed inside the support membrane. In the solidification of an isotropic polybenzazole polymer solution in the present invention, the structures and the porosities of the surface and the inside of the support membrane are controlled successfully by choosing solidification conditions and a poor solvent among water vapor, aqueous solution of methanesulfonic acid, aqueous solution of phosphoric acid, aqueous solution of glycerin and aqueous solutions of inorganic salts such as aqueous solution of magnesium chloride. Particularly preferred methods for solidification include a method comprising contacting the solution with water vapor to solidify it, a method comprising contacting the solution with water vapor for a short period of time in the early stage of solidification and then contacting it with water, and a method comprising contacting the solution with an aqueous solution of methanesulfonic acid.

The support membrane tends to shrink with progress of solidification of the polymer. During the progress of the solidification, a tender or a fixing frame may be used for preventing the formation of wrinkles caused by uneven shrinkage of the support membrane. Moreover, in the case of solidifying a polymer solution shaped on a substrate plate such as a glass plate, the shrinkage on the substrate plate may be inhibited by controlling the roughness of the surface of the substrate plate.

It is desirable that the support membrane solidified in the manner mentioned above be fully washed for avoidance of problems such as acceleration of decomposition of the polymer caused by remaining solvent or spill of remaining solvent during the use of a composite electrolyte membrane. The washing can be performed through immersion of the support membrane in washing liquid. Particularly desirable washing liquid is water. It is desirable that the washing with water be carried out until the washings come to have pH within the range of from 5 to 8, more desirably from 6.5 to 7.5.

By use of an isotropic polybenzazole polymer solution having with a concentration within the above-mentioned specific range and use of a proper solidification method selected from the methods mentioned above, a support membrane made of a polybenzazole polymer having a structure suitable for the purpose of the present invention can be obtained. It is a porous support membrane with continuous voids having openings in at least one surface of the support membrane. The facts that the support membrane has three-dimensional network structure made of fibril fibers of polybenzazole polymer and that it has three-dimensionally continuous voids were confirmed by observation of the surface of the support membrane in water using an atomic force microscope and by cross-sectional observation using transmission electron microscopic observation of the support membrane holding its structure in water by epoxy embedding-epoxy removal. Japanese Patent Laying-Open No.2002-203576 discloses an electrolyte membrane comprising a membrane support having open pores penetrating in the thickness direction of the membrane and ion-conducting material introduced into the support. However, it is undesirable for a support in which the direction of the open pores is restricted mainly to the thickness direction of the membrane such as that disclosed in the publication to be used for an electrolyte membrane of a fuel cell because of problem, for example, in that during its use as anion exchange membrane of a fuel cell, occurrence of conditions uneven in both directions of the membrane regarding concentration distribution of fuel gas and amount of adhering electrode catalyst caused by a small continuity of the ion-conducting material in both directions of the membrane tends to cause a local deterioration of the ion exchange membrane.

The porosity of the support membrane of the present invention is preferably 90% by volume or more, and more preferably 95% by volume or more. A porosity under this range is undesirable because combining of the membrane with ion exchange resin results in a small content of the ion exchange resin, which leads to a reduced ionic conductivity.

The support membrane of the present invention preferably has at least one surface having a surface open area ratio of 40% or more, more preferably 50% or more, and particularly preferably 60% or more. A case where at least one surface has a surface open area ratio under this range is unfavorable because ion exchange resin becomes difficult to soak into voids of the support membrane when the support membrane and the ion exchange resin are combined.

Described below is a method to obtain a composite ion exchange membrane by combining ion exchange resin with the porous support membrane made of a polybenzazole polymer obtained in the method described above. The method is one which includes immersing the support membrane in an ion exchange resin solution without drying it to allow the ion exchange resin solution to displace the liquid inside the support membrane, thereby obtaining a composite ion exchange membrane. In the case where the liquid inside the ion exchange membrane has a solvent composition different from that of the ion exchange resin solution, a method which includes allowing the liquid inside to be displaced in advance in conformity to the solvent composition of the ion exchange resin solution can also be applied.

The support membrane of the present invention has a characteristic in that the void structure shrinks and the apparent volume of the support membrane decreases greatly with decrease of the liquid inside the voids caused by drying. In the case where the support membrane is dried under control of its shrinkage in both directions by fixing it, for example, in a metal frame without allowing ion exchange resin to soak in the support membrane, a shrinkage occurs in the thickness direction and the apparent thickness of the support membrane after the drying is within the range of from 0.5% to 10% of the thickness before the drying. Porous support membranes other than the support membrane of the present invention, for example, support membranes made of drawn polytetrafluoroethylene polymer porous membranes do not cause such a great shrinkage.

When the liquid inside the voids of the support membrane is displaced by ion exchange resin solution and then the solution is dried, the support membrane shrinks as the volume of the ion exchange resin solution decreases through evaporation of the solvent of the ion exchange resin solution contained in the voids due to the above-mentioned characteristics of the support membrane. Therefore, a dense composite membrane structure where the voids in the support membrane are filled with the crystallized ion exchange resin can be obtained easily. Due to this composite membrane structure, the composite ion exchange membrane of the present invention exhibits a superior fuel permeation inhibitability. Porous support membranes other than the support membrane of the present invention, for example, support membranes made of drawn polytetrafluoroethylene polymer porous membranes are undesirable because even if the solvent of an ion exchange resin solution soaked into voids evaporates and, as a result, the volume of the ion exchange resin solution decreases, this will be accompanied by a small shrinkage of a support membrane and, therefore, many voids which are not filled with ion exchange resin will be formed inside the composite membrane after drying and, moreover, no surface layers free of supports are formed on both sides of the support membrane.

In addition, because the support membrane shrinks greatly, adjustment of the combination of the concentration and the viscosity of the ion exchange resin solution and physical properties of the solvent such as volatility with the thickness, the porosity and the like of the support membrane will lead to the formation of the composite layer in which voids in the support membrane are filled with the ion exchange resin and also to the formation of ion exchange resin layers free of the supports, which formation is caused when the excess ion exchange resin solution adhering to both sides of the support membrane and the ion exchange resin solution excreted from the inside of the support membrane with the shrinkage of the support membrane are allowed to dry outside the surfaces of the support membrane. As a result, in the composite ion exchange membrane, a structure where the surface layers are formed of ion exchange resin free of support membranes, the surface layers being formed on both surfaces of the composite layer so as to sandwich the composite layer there between, can be realized easily.

Porous support membranes other than the support membrane of the present invention, for example, porous support membranes of polytetrafluoroethylene polymer do not cause great shrinkage as mentioned above. Therefore, even if ion exchange resin forms solids inside the support membrane in the course of impregnating it with an ion exchange resin solution and drying, voids will remain intact and no ion exchange resin layer sandwiching the support membrane composite layer. The elimination of this situation requires repeating the impregnation with the ion exchange resin solution and the drying twice or more, which will adversely complicate the process.

The ion exchange resin for use in the composite ion exchange membrane of the present invention is not particularly restricted. Examples of applicable ion exchange resin include, in addition to the aforementioned per fluorocarbon sulfonic acid polymer, at least one ionomer selected from polystyrene sulfonic acid, poly (trifluorostyrene) sulfonic acid, polyvinyl phosphonic acid, polyvinyl carboxylic acid and polyvinyl sulfonic acid polymer, and ionomer resulting from sulfonation, phosphonation or carboxylation of at least one substance selected from aromatic polymers such as polysulfide, polyphenylene oxide, polyphenylene sulfoxide, polyphenylene sulfide, polyphenylene sulfide sulfone, polyparaphenylene, polyphenylquinoxaline, poly arylketone, polyetherketone, polybenzazole and polyaramide polymer. The polysulfone polymer referred to herein include at least one selected from polyethersulfone, polyarylsulfone, polyarylethersulfone, polyphenylsulfone and polyphenylenesulfone polymer. The polyetherketone polymer referred to herein include at least one selected from polyetheretherketone, polyetherketone-ketone, polyetheretherketone-ketone and polyetherketone ether-ketone polymer.

The solvent in the ion exchange resin solution described above may be selected from solvents which dissolve ion exchange resin without dissolving, decomposing or extremely swelling polybenzazole polymer support membrane. Since the support membrane is impregnated with the ion exchange resin solution and then the ion exchange resin is precipitated through removal of the solvent, the solvent is preferably one which can be removed, for example, by being evaporated by means of heating or pressure reduction. The fact that a composite ion exchange membrane can be produced using an ion exchange resin solution containing a high-boiling solvent which can not be used in the preparation of a composite ion exchange membrane using a support membrane made of polytetrafluoroethylene which exhibits a creep at temperatures of about 100° C. or higher since the polybenzazole polymer support membrane of the present invention has high heat resistance is a superior feature from the viewpoint that many kinds of ion exchange resin can be chosen.

The concentration of the ion exchange resin solution and the molecular weight of the ion exchange resin described above are not particularly restricted They are chosen appropriately according to the kind of the ion exchange resin and the thickness of the composite ion exchange membrane to be obtained.

The content of the ion exchange resin in the composite ion exchange membrane obtained in the manner mentioned above is desirably 50% by weight or more, and more desirably 80% by weight or more. A content under this range is unfavorable because it results in a large conductive resistance or a reduced water retentivity of a membrane and therefore sufficient generation performance can not be obtained.

The composite ion exchange membrane of the present invention is characterized by having surface layers formed of ion exchange resin free of supports, the surface layers being formed on both surfaces of the composite layer so as to sandwich the composite layer there between as described above. Since the composite ion exchange membrane has the composite layer and the surface layers, the composite ion exchange membrane has a high mechanical strength and has the advantage that when an electrode layer is formed on its surface, it exhibits a superior adhesion with the electrode layer. Each of the surface layers preferably has a thickness of from 1 μm to 50 μm which does not exceed half the total thickness of the composite ion exchange membrane. The situation where the surface layers have thicknesses under that range is undesirable because, for example, the adhesion with the electrode layer worsens and the ionic conductivity decreases On the other hand, the situation where the surface layers have thicknesses over the above-mentioned range is undesirable because, for example, since the reinforcing effect by the composite layer does not reach the outermost layer of the composite ion exchange membrane, only the surface layers swell greatly to peel off from the composite layer when the composite ion exchange membrane absorbs moisture. A more desirable range of the thickness of the surface layers is from 2 μm to 30 μm.

For the purpose of further improving characteristics of the composite ion exchange membrane, such as mechanical strength, ionic conductivity and peeling resistance of the ion exchange resin layers formed on the surfaces, a method in which the composite ion exchange membrane is subjected to heat treatment under appropriate conditions may also be preferably employed. In addition, in order to adjust the thickness of the ion exchange resin surface layers formed on the surfaces, available are a method in which the amount of the ion exchange resin layer adhered is increased by immersing the composite ion exchange membrane further in an ion exchange resin solution or applying the ion exchange resin solution to the composite ion exchange membrane, followed by drying, or a method in which the amount of the ion exchange resin layer adhered is decreased by immersing the composite ion exchange membrane in an ion exchange resin solution, followed by subjecting part of the ion exchange resin solution which adhered to the surface of the support membrane to scrape with a scraper, an air knife or a roller or to absorb with a material capable of absorbing the solution, such as filter paper and sponge. Alternatively, a method to improve the adhesion of the ion exchange resin layer by hot pressing is also used in combination.

The composite ion exchange membrane of the present invention exhibits an elongation when it is applied with a load of 1 MPa for two hours under a dry atmosphere at 130° C., namely a high-temperature creep elongation, of up to 50% and preferably up to 30%. A high-temperature creep elongation over the above-mentioned range is unfavorable because when the composite ion exchange membrane is used in a solid polymer fuel cell, a great deformation of the membrane is caused by heat or pressure during electric power generation and this will cause breakage of the composite ion exchange membrane or delamination of electrode layers adhered to the ion exchange membrane. Ion exchange membranes whose heat resistance has been improved by cross linking of electrolyte such as those of the prior art shown above exhibit resistance to creep caused by a load for a short time of about four minutes. However, they are unfavorable because they exhibit an insufficient effect of inhibiting a high-temperature creep elongation to a load of a long period of time. Moreover, the composite ion exchange membrane of the present invention exhibits an elongation when it is applied with a load of 1 MPa for two hours in water at 130° C., namely a creep elongation in high temperature water, of up to 60%, more desirably up to 40%. If the creep elongation in high temperature water is in the range provided above, the damage caused by deformation of an ion exchange membrane or the delamination of an electrode layer adhered to the ion exchange membrane can be inhibited or the lowering of ionic conductivity caused by swelling of the ion exchange membrane can be prevented even if fuel cells are practically operated under a high temperature, humidified atmosphere. A creep elongation in high temperature water over the range provided above is unfavorable because ion exchange membranes deform greatly or the ionic conductivity is lowered during its operation under a high temperature, humidified atmosphere.

The composite ion exchange membrane of the present invention is superior in mechanical strength while having a high ionic conductivity. Making the most of these characteristics, it is possible to use it as a composite ion exchange membrane, particularly a solid polymer electrolyte membrane for solid polymer fuel cells.

The electrode to be used in the present invention is not particularly restricted and may be appropriately chosen according to the shape and application of fuel cells. For example, carbon paper, carbon cloth and the like may be chosen. In addition, materials water-repelled with PTFE or the like may also be used. The electrode is not particularly restricted with respect to its thickness, but preferred are those having a thickness of up to 400 μm. Those having a thickness of up to 300 μm are more preferred.

The catalyst layer used in the present invention refers to a layer having a catalyst such as platinum. The catalyst is not particularly restricted if it can be used for solid polymer fuel cells. It is preferable that a catalyst of metal, such as platinum, or alloy be contained in the catalyst layer in a state where it is carried on carbon black. The catalyst layer contains ion exchange resin. The ion exchange resin may be the same as or different from, but is preferably the same as, that contained in the composite ion exchange membrane. Two or more kinds of ion exchange resin may be contained. The catalyst layer may contain, in addition to ion exchange resin, other resins such as fluororesin. Moreover, it may contain free carbon black carrying no catalyst.

The method for fabricating the electrolyte membrane-electrode assembly of the present invention is not particularly restricted and may be appropriately chosen according to the shape and application of fuel cells. Any method may be used, for example, a method in which electrodes on which ink or paste prepared by dispersing carbon black carrying a catalyst such as platinum in a solution of ion exchange resin or a solution containing ion exchange resin and a binding agent is sprayed or applied and then dried are laminated together and then hot pressed so that an electrolyte membrane comes into contact with a catalyst layer; a method in which electrolyte membranes on which ink or paste prepared by dispersing carbon black carrying a catalyst such as platinum in a solution of ion exchange resin or a solution containing ion exchange resin and a binding agent is sprayed or applied and then dried are laminated together and then hot pressed so that an electrode comes into contact with a catalyst layer; a method in which releasing materials on which ink or paste prepared by dispersing carbon black carrying a catalyst such as platinum in a solution of ion exchange resin or a solution containing ion exchange resin and a binding agent is sprayed or applied and then dried are laminated together and then hot pressed so that an electrolyte membrane comes into contact with a catalyst layer, thereby the catalyst layer is transferred onto the electrolyte membrane, and then the resulting membranes are laminated and hot pressed so that an electrode comes into contact with a catalyst layer; a method in which an electrolyte membrane and an electrode are bonded using, as a binder, ink or paste prepared by dispersing carbon black carrying a catalyst such as platinum in a solution of ion exchange resin or a solution containing ion exchange resin and a binding agent; and a method in which materials prepared by dispersing carbon black carrying a catalyst such as platinum in a solution containing a binding agent such as fluororesin, applying the resultant to an electrode, drying and then baking are laminated and then hot pressed so that the electrode comes into contact with a catalyst layer. During the hot pressing, membranes and/or electrodes may contain water, an organic solvent such as alcohol, an aqueous acid solution, and the like.

Use of the composite ion exchange membrane of the present invention makes it easy to produce an electrolyte membrane-electrode assembly because the membrane causes less swelling or less deformation during the production.

Many composite ion exchange membranes having a support membrane as a surface layer of an ion exchange membrane exhibit an adhesion to electrodes inferior to that of ion exchange membranes composed only of ion exchange resin. However, the composite ion exchange membrane of the present invention can be bonded to an electrode easily like the ion exchange membranes composed only of ion exchange resin because it has on both sides surface layers made of ion exchange resin containing no support membrane.

The electrolyte membrane-electrode assembly of the present invention has a high ionic conductivity, but is superior in mechanical strength. Making the most of these characteristics, it is possible to use it particularly as a solid polymer electrolyte membrane-electrode assembly for solid polymer fuel cells.

EMBODIMENTS

Examples of the present invention will be described below, which, however, in no way limit the scope of the present invention.

The evaluation methods and the analysis methods used in implementing the present invention are described below.

<Structural Observation by Transmission Electron Microscope>

The observation of a cross-sectional structure of a membrane by a transmission electron microscope (TEM) was carried out in the method described below. First, a sample slice for observation was prepared in the manner provided below. That is, water inside a support membrane sample after washing with water was displaced by ethanol, which was then further displaced fully by epoxy monomer. The sample was held as it was in epoxy monomer at 45° C. for six hours and was additionally heat treated at 60° C. for 20 hours to allow the epoxy to cure (epoxy embedding).

The sample thus epoxy embedded was sliced with a microtome equipped with a diamond knife into an ultrathin section having a thickness at which the interference colors exhibit from silver color to gold color. The epoxy was removed by treating the section with a KOH-saturated ethanol solution for 15 minutes (epoxy removal). Carbon was deposited onto the sample which was further washed with ethanol and then with water and subsequently was stained with Roughed 4. Then, the sample was observed by a TEM (JEM-2010) manufactured by JEOL at an acceleration voltage of 200 kV.

<Structural Observation by Atomic Force Microscope>

The structural observation by an atomic force microscope (AFM) was carried out in the method described below. Using an AFM (Slab 300 [observation mode: DFM mode, cantilever: SI-Fib 3; scanner: FS-100A] manufactured by Seiko Instruments Inc., structural observation of a surface of an undried support membrane held on a sample stage in water was carried out.

<Structural Observation by Scanning Electron Microscope>

The structural observation by a scanning electron microscope (SEM) was carried out in the method described below. First, water in a support membrane sample washed with water was displaced by ethanol, which was then further displaced fully by isoamyl acetate. The resultant was subjected to $CO_2$ supercritical point drying using a supercritical point drying apparatus (HCP-1) manufactured by Hitachi, Ltd. The support membrane thus supercritical point dried was applied with a platinum coating with a thickness of 150 angstroms and then was observed at an acceleration voltage of 10 kV at a sample inclining angle of 30 degrees using an SEM (S-800) manufactured by Hitachi, Ltd.

<Intrinsic Viscosity>

The viscosity of a polymer solution adjusted to have a concentration of 0.5 g/L using methanesulfonic acid as solvent was measured with an Ubbelohde's viscometer in a thermostat at 25° C. and then the intrinsic viscosity was calculated.

<Thickness of Support Membrane>

The thickness of an undried support membrane was measured by the following method. Using a micrometer designed such that the measuring load can be changed, the thickness of a support membrane in water at each load was measured. The value of an intercept obtained by plotting thickness measured versus load and extrapolating a linear portion to a load of zero was defined as thickness. The mean value of the thicknesses obtained by the measurement repeated at n=5 for one sample was used as the thickness of the support membrane.

<Surface Open Area Ratio of Support Membrane>

The surface open area ratio of a support membrane was determined by the following method. In a scanning electron microphotograph with a multiplication of 10,000 of the surface of the support membrane taken in the way described above, a visual field corresponding to a square with sides having a length of 5 µm was chosen and was colored into white for portions corresponding to the outermost surface of the membrane and to black for the other portions. Thereafter, the image was captured into a computer through an image scanner. Using image analysis software Scion Image available from Scion Corp., U.S.A., the proportion accounted for by the black portions in the image was measured. This operation was repeated three times for one sample and the average was used as the surface open area ratio.

<Porosity of Support Membrane>

The porosity of a support membrane was determined by the following method. The volume Vw [mL] of the water filling the voids in the membrane can be obtained by dividing the weight of water calculated from the difference between the weight of a support membrane in a water-containing condition and an absolutely dried support membrane by the density of water. The porosity of the support membrane was determined from Vw and the volume of the membrane in a water-containing condition Vm [mL] by a calculation shown below.

Porosity of support membrane [%]=$Vw/Vm \times 100$

<Thickness of Composite Ion Exchange Membrane and Thickness of Layers Constituting the Membrane>

The thickness of the composite layer constituting the composite ion exchange membrane and the thickness of the ion exchange resin layers formed on both sides of the composite layer so as to sandwich the composite layer were determined by photographing, by an optical microscope, a section of the composite ion exchange membrane fully cooled in liquid nitrogen cut with a brand-new razor blade fully cooled in liquid nitrogen and then comparing it with a scale with a known length photographed at the same multiplication.

Regarding the thickness of the composite layer constituting the composite ion exchange membrane and the thickness of the surface layers formed of ion exchange resin free of support membranes, the surface layers being formed on both surfaces of the composite layer so as to sandwich the composite layer there between, a sample block was prepared by embedding a composite membrane sample cut into 300 µm in width and 5 mm in length with resin having a composition of Luveak-812 (available from Nakalai tesque)ALuveak-NMA (available from Natalia tesque)/DMP30 (available from TAAB)=100/89/4 and then cured it at 60° C. for 12 hours. A tip of the block was cut with a diamond knife (SK2045 manufactured by Sumitomo Electric Industries, Ltd.) using an ultra microtome (2088Astrodome manufactured by LKB) such that a smooth section was exposed. The thicknesses were determined by photographing the section of the composite membrane thus exposed by an optical microscope and then comparing it with a scale with a known length photographed at the same multiplication. For example, in the case where the support has a large porosity, there are some cases where no clear interface is formed between at least one surface layer and a composite layer arranged inside the surface layer and the structure near the interface changes continuously. In such cases, a portion closest to the outer surface of the composite ion exchange membrane, among the portions where a continuous structural change can be confirmed by an optical microscope was defined as the outermost surface of the composite layer and the distance from it to the outer surface of the composite ion exchange membrane was defined as the thickness of the surface layer. <Ion Exchange Resin (ICP) Content of Composite Ion Exchange Membrane>The ion exchange resin content of a composite ion exchange membrane was determined by the following method. The weight Dc [g/m²] of a composite ion exchange membrane was measured. From the weight and the weight Ds [g/m²] of a dry support membrane measured by drying a support membrane the same as that used in the preparation of the composite ion exchange membrane without being combined with ion exchange resin, the ion exchange resin content was determined by the calculation shown below.

Ion exchange resin content [wt %]=$(Dc-Ds)/Dc \times 100$

<Strength/Tensile Modulus>

The strength characteristic of an ion exchange membrane was measured under an atmosphere at a temperature of 25° C. and a relative humidity of 50% using a Tension manufactured by Orientech Co. The sample was formed in a 10-mm wide strip-form. The characteristic was calculated from a stress-strain curve measured at a span length of 40 mm and a tensile speed of 20 mm/sec.

<Creep Elongation>

The creep elongation of an ion exchange membrane was determined by the following method. By using a 10-mm wide strip-form membrane sample and placing it under an atmosphere at a temperature of 80° C. and a relative humidity of 95% at a span length of 50 mm under a load such that a load of 8.1 MPa was applied to an initial cross-sectional area of the membrane sample, the creep elongation was determined from an amount of displacement after 40 hours. The load is the amount of stress applied to the membrane sample divided by the initial cross-sectional area of the cross section perpendicularly intersecting the loading direction of the membrane sample.

<High-Temperature Creep Elongation>

The high-temperature creep elongation of an ion exchange membrane was determined by the following method. That is determined according to the calculation formula shown below using a distance between chucks L measured by setting a 5-mm wide strip-form membrane sample in a dry atmosphere at 130° C. at an initial span length $L_0=25$ mm under a load such that a load of 1 MPa was applied to an initial cross-sectional area of the membrane sample and then loading the sample for two hours.

$$\text{High-temperature creep elongation } [\%] = \{(L-L_0)/L_0\} \times 100$$

The dry atmosphere is an air or nitrogen atmosphere dried so as to have a dew point of −30° C. or lower.

<Creep Elongation in High Temperature Water>

The creep elongation of an ion exchange membrane in high temperature water was determined by the following method. That is determined according to the calculation formula shown below using a distance between chucks L measured by placing a 5-mm wide strip-form membrane sample in water filled in a pressure resistant apparatus whose inside can be observed while applying thereto a constant load which was adjusted to be a load of 1 MPa to an initial cross section of the membrane sample at an initial span length $L_0=25$ mm.

$$\text{Creep elongation in high temperature water } [\%] = \{(L-L_0)/L_0\} \times 100$$

<Dimensional Change of Ion Exchange Resin>

The dimensional change of an ion exchange membrane between before and after water absorption was measured by the following method. A square sample with sides having a length of A cm was cut from an ion exchange membrane vacuum dried at 110° C. for six hours. Assuming that after the sample was immersed in purified water at 80° C. for 24 hours to contain water, a longitudinal side and a transverse side be B cm and C cm in length, respectively, the values calculated according to the following formulas were defined as dimensional changes in the longitudinal direction and the transverse direction. The longitudinal direction and the transverse direction used herein are names for convenience regarding the direction of the sample for dimensional change measurement and do not indicate specific directions of the membrane. However, when there is an apparent directivity in the production of the ion exchange membrane, it is convenient that the machine direction in the production be defined as the longitudinal direction.

$$\text{Longitudinal dimensional change } [\%] = ((B-A)/A) \times 100 \quad \text{(Formula 2)}$$

$$\text{Transverse dimensional change } [\%] = ((C-A)/A) \times 100 \quad \text{(Formula 3)}$$

The fact that a calculated result of a formula above is a positive number indicates that the length of the side has increased. On the other hand, the fact that a calculated result is a negative number indicates that the length of the side has decreased.

<Gas Permeability>

The gas permeability of an ion exchange membrane was measured by the following method. An ion exchange membrane was placed on a mesh-form support of stainless steel and was fixed to a holder. Then, helium gas saturated with water vapor was ventilated to one side of the ion exchange membrane so that the gauge pressure became 0.09 MPa and the amount of helium gas which passed through to the other side of the ion exchange membrane was measured and calculated using a soap film flow meter.

<Ionic Conductivity>

The ionic conductivity σ was determined in the manner described below. Platinum wires (diameter: 0.2 mm) were pressed against the surfaces of a 10-mm wide striped membrane sample on a self-made probe (made of polytetrafluoroethylene) for measurement. The sample was measured for the alternating current impedance between the platinum wires at 10 kHz using a 1250 Frequency Response Analyser manufactured by Solectron while being held in a thermohygrostat at 80° C. and 95% RH The measurement was conducted while the distance between the electrodes was varied from 10 mm to 40 mm at intervals of 10 mm. From a slope Dr [Ω/cm] of a straight line obtained by plotting distances between the electrodes versus resistance measurements, an ionic conductivity was calculated according to the formula shown below while the contact resistance between the membrane and the platinum wires was cancelled.

$$\sigma[\text{S/cm}] = 1/(\text{Membrane Width} \times \text{Membrane Thickness } [\text{cm}] \times Dr)$$

<Evaluation of Adhesion of Electrode Layer onto Ion Exchange Membrane>

The evaluation of the adhesion of an electrode layer onto an ion exchange membrane was conducted in the method described below. First, an electrode paste was prepared by dispersing in 0.6 g of 10 wt % platinum catalyst carried on carbon (EC-10-PRC) available from ElectroChem, Inc., U.S.A. in 5 g of a 5 wt % Nation solution available from Aldrich, U.S.A.. The catalyst paste was applied to sheets of polytetrafluoroethylene (PTFE) with an applicator and was dried in an oven at 100° C. for 10 minutes. Thus, electrode coating films 20 μm in thickness were formed on the PTFE sheets. The electrode coating films each formed on a PTEF sheet were allowed to face each other on both sides of an ion exchange membrane and were subjected to hot press at 130° C. under a pressure of 5 MPa for three minutes. Thus, electrode layers were bonded to the surfaces of the ion exchange membrane. Subsequently, the PTFE sheet was removed. When delamination of electrode layers was found in no one of three samples prepared in a manner the same as that mentioned above, it is judged as being good in electrode adhesion. If part or the whole of an electrode layer delaminated from the surface of an ion exchange membrane in any one of the three samples, it is judged as being poor in electrode adhesion.

<Electric Power Generation Characteristics>

The electric power generation characteristics of the electrolyte membrane-electrode assemblies produced by the methods described in the following Examples and Comparative Examples were determined by the method shown below. When an electrolyte membrane-electrode assembly was incorporated in a fuel cell for evaluation FC25-02SP manufactured by ElectroChem, Inc. and then an evaluation of current-voltage characteristic was conducted at a cell temperature of 80° C., a gas humidifying temperature of 80° C. at gas flow rates of 300 mL/min for hydrogen as fuel gas and 1000 mL/min for air as oxidizing gas under ambient pressure, the current density expressed in the unit of [A/cm$^2$] at a cell voltage of 0.2 V was used as the electric power generation characteristic of the electrolyte membrane-electrode assembly.

EXAMPLE 1

An isotropic solution with a poly(p-phenylene-cis-benzobisoxazole) concentration of 1% by weight was prepared. by diluting a dope comprising polyphosphoric acid containing 14% by weight of poly(p-phenylene-cis-benzobisoxazole) polymer having IV=24 dL/g by addition of methane sulfonic acid. This solution was formed into a film on a glass plate heated to 90° C. at a film formation rate of 5 mm/sec using an applicator with a clearance of 300 µm. The thus obtained dope film was solidified on the glass plate used in the film formation in a thermohygrostat at 25° C. and 80% RH for one hour and then was washed with water until the washings exhibited pH 7±0.5, yielding a support membrane. The structural observation of the resulting support membrane confirmed that it was a porous membrane with continuous pores having openings in both surfaces of the membrane. The support membrane was fixed in a stainless steel frame in water and the water contained in the support membrane was displaced by a mixed solvent having a solvent composition of water:ethanol:1-propanol=26:26:48 (weight ratio), which is almost the same as that of a 20% Nation (commercial name) solution (product number: SE-20192) manufactured by Du Pont, which is an ion exchange resin solution. The resulting support membrane was immersed in a 20% Nation (commercial name) solution at room temperature for 15 hours and then was removed from the solution. The solvent in the Nation (commercial name) solution which permeated into the membrane or attached to the surface of the membrane was volatilized to dry by air-drying. The dried membrane was preheated for one hour in an oven at 60° C. for removal of the remaining solvent and then was subjected to heat treatment for one hour at 150° C. under nitrogen atmosphere. Thus, a composite ion exchange membrane of Example 1 was prepared.

EXAMPLE 2

A composite ion exchange membrane of Example 2 was prepared in the same way as that described in Example 1 except that the rinsed support membrane was fixed in a stainless steel frame and then was immersed in a 10% Nation (commercial name) solution (product number: SE-10192) manufactured by Du Pont without displacing the water in the support membrane.

EXAMPLE 3

A composite ion exchange membrane of Example 3 was prepared in the same way as that described in Example 1 except that the heat treatment temperature was changed to 130° C.

EXAMPLE 4

A composite ion exchange membrane of Example 4 was prepared in the same way as that described in Example 3 except that the rinsed support membrane was fixed in a stainless steel frame and then was immersed in a 10% Nation (commercial name) solution (product number: SE-10192) manufactured by Du Pont without displacing the solution in the membrane.

EXAMPLE 5

A composite ion exchange membrane of Example 5 was prepared in the same way as that described in Example 4 except that solidification was conducted in a thermohygrostat at 25° C. and 80% RH for three minutes, followed by an additional solidification in purified water at 25° C. for 15 minutes.

EXAMPLE 6

A composite ion exchange membrane of Example 6 was prepared in the same way as that described in Example 4 except that the temperature of the glass plate and the film formation rate in the film formation were changed to 70° C. and 50 mmjsec, respectively.

EXAMPLE 7

A composite ion exchange membrane of Example 7 was prepared in the same way as that described in Example 1 except that a solution with a poly(p-phenylene-cis-benzobisoxazole) concentration of 1.5% by weight was prepared by diluting a dope comprising polyphosphoric acid containing 14% by weight of poly(p-phenylene-cis-benzobisoxazole) polymer having IV=24 dL/g by addition of methane sulfonic acid.

EXAMPLE 8

A composite ion exchange membrane of Example 8 was prepared in the same way as that described in Example 1 except that the film formation rate of the poly(p-phenylene-cis-benzobisoxazole) solution was changed to 10 mm/sec. The composite ion exchange membrane prepared in this way had a thickness of 50 µm. The thickness of the composite layer was 20 Am, which accounted for 40% of the thickness of the membrane.

EXAMPLE 9

A composite ion exchange membrane of Example 9 was prepared in the same way as that described in Example 8 except that the rinsed support membrane was fixed in a stainless steel frame and then was immersed in a 10% Nation (commercial name) solution (product number: SE-10192) manufactured by Du Pont without displacing the water in the support membrane. The composite ion exchange membrane prepared in this way had a thickness of 21 µm. The thickness of the composite layer was 11 µm, which accounted for 52% of the thickness of the membrane.

EXAMPLE 10

A composite ion exchange membrane of Example 10 was prepared in the same way as that described in Example 8 except that the clearance of the applicator in the film formation of the poly(p-phenylene-cis-benzobisoxazole) solution was changed to 550 µm. The composite ion exchange membrane prepared in this way had a thickness of 68 µm. The thickness of the composite layer was 62 µm, which accounted for 91% of the thickness of the membrane.

EXAMPLE 11

A composite ion exchange membrane of Example 11 was prepared in the same way as that described in Example 8 except that the heat treatment temperature was changed to 130° C.

EXAMPLE 12

A composite ion exchange membrane of Example 12 was prepared in the same way as that described in Example 10 except that the rinsed support membrane was fixed in a stainless steel frame and then was immersed in a 10% Nation (commercial name) solution (product number: SE-10192) manufactured by Du Pont without displacing the solution in the membrane.

EXAMPLE 13

A composite ion exchange membrane of Example 13 was prepared in the same way as that described in Example 11 except that solidification was conducted in a thermohygrostat at 25° C. and 80% RH for three minutes, followed by an additional solidification in purified water at 25° C. for 15 minutes.

EXAMPLE 14

A composite ion exchange membrane of Example 14 was prepared in the same way as that described in Example 11 except that the temperature of the glass plate and the film formation rate in the film formation were changed to 70° C. and 50 mm/sec, respectively.

EXAMPLE 15

A composite ion exchange membrane of Example 15 was prepared in the same way as that described in Example 8 except that a solution with a poly(p-phenylene-cis-benzobisoxazole) concentration of 1.5% by weight was prepared by diluting a dope comprising polyphosphoric acid containing 14% by weight of poly(p-phenylene-cis-benzobisoxazole) polymer having IV=24 dL/g by addition of methane sulfonic acid.

EXAMPLE 16

A composite ion exchange membrane of Example 16 was prepared in the same way as that described in Example 1 except that the isotropic solution of poly(p-phenylene-cis-benzobisoxazole) was formed into a film on a glass plate heated to 70° C.

EXAMPLE 17

A composite ion exchange membrane of Example 17 was prepared in the same way as that described in Example 16 except that the rinsed support membrane was fixed in a stainless steel frame in water and then was immersed in a 10% Nation (commercial name) solution (product number: SE-10192) manufactured by Du Pont without displacing the water in the support membrane.

EXAMPLE 18

A composite ion exchange membrane of Example 18 was prepared in the same way as that described in Example 16 except that the heat treatment temperature was changed to 130° C.

EXAMPLE 19

A composite ion exchange membrane of Example 19 was prepared in the same way as that described in Example 18 except that the rinsed support membrane was fixed in a stainless steel frame in water and then was immersed in a 10% Nation (commercial name) solution (product number: SE-10192) manufactured by Du Pont without displacing the water in the support membrane.

EXAMPLE 20

A composite ion exchange membrane of Example 20 was prepared in the same way as that described in Example 16 except that an isotropic solution with a poly(p-phenylene-cis-benzobisoxazole) concentration of 1.5% by weight was prepared by diluting a dope comprising polyphosphoric acid containing 14% by weight of poly(p-phenylene-cis-benzobisoxazole) polymer having IV=24 dL/g by addition of methane sulfonic acid and the resulting solution was used.

EXAMPLE 21

A composite ion exchange membrane of Example 21 was prepared in the same way as that described in Example 1 except that poly(p-phenylene-cis-benzobisoxazole) polymer having IV=23 dL/g was used in place of the poly(p-phenylene-cis-benzobisoxazole) polymer having IV=24 dL/g.

EXAMPLE 22

A composite ion exchange membrane of Example 22 was prepared in the same way as that described in Example 21 except that an isotropic solution with a poly(p-phenylene-cis-benzobisoxazole) concentration of 1.5% by weight was prepared by diluting a dope comprising polyphosphoric acid containing 14% by weight of poly(p-phenylene-cis-benzobisoxazole) polymer having IV=23 dL/g by addition of methane sulfonic acid and the resulting solution was used.

EXAMPLE 23

A composite ion exchange membrane of Example 23 was prepared in the same way as that described in Example 1 except that the time for which the solvent-replaced support membrane was immersed in a 20% Nation (commercial name) solution was changed to one hour.

EXAMPLE 24

A composite ion exchange membrane of Example 24 was prepared in the same way as that described in Example 23 except that the rinsed support membrane was fixed in a stainless steel frame in water and then was immersed in a 10% Nation (commercial name) solution (product number: SE-10192) manufactured by Du Pont without displacing the water in the support membrane.

EXAMPLE 25

An isotropic solution with a poly(p-phenylene-cis-benzobisoxazole) concentration of 1% by weight was prepared by diluting a dope comprising polyphosphoric acid containing 14% by weight of poly(p-phenylene-cis-benzobisoxazole) polymer having IV=24 dL/g by addition of methane sulfonic acid. This solution was formed into a film on a glass plate heated to 70° C. at a film formation rate of 5 mm/sec uring an applicator with a clearance of 300 μm. The dope film formed on the glass plate was placed as it was in a thermohygrostat at 25° C. and 80% RH to be solidified for 10 minutes and was further solidified in purified water at 25° C. for additional 15 minutes. The resulting film was washed with water until the washings exhibited pH 7±0.5, yielding a support membrane. The surface morphology observation by an atomic force microscope and section morphology observation by a transmission electron microscope of the resulting support membrane confirmed that it was a porous membrane with continuous pores having openings in both surfaces of the membrane. The support membrane was fixed in a stainless steel frame in water and the water contained in the support membrane was displaced by a mixed solvent having a solvent composition of water:ethanol:1-propanol=26:26:48 (weight ratio), which is almost the same as that of a 20% Nation (commercial name) solution (product number: SE-20192) manufactured by Du Pont, which is an ion exchange resin solution. The resulting support membrane was immersed in a 20% Nation (commercial name) solution at 25° C. for 15 hours and then was removed from the solution. The solvent in the Nation (commercial name) solution which permeated into the membrane or attached to the surface of the membrane was volatilized to dry by air-drying. The dried membrane was preheated for one hour in an oven at 60° C. for removal of the remaining solvent and then was subjected to heat treatment for one hour at 150° C. under nitrogen atmosphere. Thus, an ion exchange membrane of Example 25 was prepared.

EXAMPLE 26

An isotropic solution with a poly(p-phenylene-cis-benzobisoxazole) concentration of 1% by weight was prepared by diluting a dope comprising polyphosphoric acid containing 14% by weight of poly(p-phenylene-cis-benzobisoxazole) polymer having IV=24 dL/g by addition of methane sulfonic acid. This solution was formed into a film on a glass, plate heated to 90° C. at a film formation rate of 20 mm/sec using an applicator with a clearance of 300 μm. The dope film formed on the glass plate was placed as it was in a thermohygrostat at 25° C. and 80% RH and was solidified for one hour. The resulting film was washed with water until the washings exhibited pH 7±0.5, yielding a support membrane. The support membrane was fixed in a stainless steel frame in water and the water contained in the support membrane was displaced by a mixed solvent having a solvent composition of water:ethanol:1-propanol=26:26:48 (weight ratio), which is almost the same as that of a 20% Nation (commercial name) solution (product number: SE-20192) manufactured by Du Pont, which is an ion exchange resin solution. The resulting support membrane was immersed in a 20% Nation (commercial name) solution at 25° C. for 15 hours and then was removed from the solution. The solvent in the Nation (commercial name) solution which permeated into the membrane or attached to the surface of the membrane was volatilized to dry by air-drying. The dried membrane was preheated for one hour in an oven at 60° C. for removal of the remaining solvent and then was subjected to heat treatment for one hour at 150° C. under nitrogen atmosphere. Thus, a composite ion exchange membrane was prepared. To a 20% Nation (commercial name) solution (product number: SE-20192) manufactured by Du Pont, platinum-carrying carbon (carbon: Volcanic-72 manufactured by Cabot Corp.; platinum carried: 40% by weight) was added so that the platinum:Nafion weight ratio became 2.7: 1, and was stirred to yield a catalyst paste. The catalyst paste was applied to a carbon paper TGPH-060 manufactured by Toray Industries, Inc. so that platinum attached thereto in an amount of 1 mg/cm$^2$ and then dried. Thus, a gas diffusion layer with an electrode catalyst layer was prepared. The aforementioned composite ion exchange membrane was sandwiched between two gas diffusion layers with an electrode catalyst layer in a manner that each electrode catalyst layer came into contact with the membrane sample. Subsequently, they were applied with pressure and heat at 120° C. and 2 MPa for three minutes by hot pressing, yielding an electrolyte-electrode assembly of Example 26.

EXAMPLE 27

To a 20% Nation (commercial name) solution (product number: SE-20192) manufactured by Du Pont, platinum-carrying carbon (carbon: Volcanic-72 manufactured by Cabot Corp.; platinum carried: 40% by weight) was added so that the platinum:Nafion weight ratio became 2.7:1, and was stirred to yield a catalyst paste. The catalyst paste was applied to a composite ion exchange membrane the same as that provided in Example 25 so that platinum attached thereto in an amount of 1 mg/cm$^2$ and then dried. Thus, an ion exchange membrane with an electrode catalyst layer was prepared. The ion exchange membrane was sandwiched between two sheets of carbon paper TGPH-060 manufactured by Toray Industries, Inc. Subsequently, they were applied with pressure and heat at 120° C. and 2 MPa for three minutes by hot pressing, yielding an electrolyte-electrode assembly of Example 27.

EXAMPLE 28

A composite ion exchange membrane of Example 28 was prepared in the same way as that described in Example 1 except that methane sulfonic acid was added to a dope comprising polyphosphoric acid containing 19% by weight of poly(2,6-diimidazo[4,5-b:4',5'-e]pyridinylene-1,4(2,5 -dihydroxy)phenylene) (henceforth abbreviated as PIPD) having an intrinsic viscosity of 18 dL/g to dilute it, yielding an isotropic solution with a PIPD concentration of 1.5% by weight, which was used as a dope for use in preparation of a support membrane.

COMPARATIVE EXAMPLE 1

As Comparative Example 1, a commercially-available Nation 112 (commercial name) membrane manufactured by Du Pont was used. This membrane is a proton exchange membrane formed of per fluorocarbon sulfonic acid polymer the same as Nation (commercial name) polymer contained in the 20% Nation (commercial name) solution used in Example 1 and the 10% Nation (commercial name) solution used in Example 2. That is widely used as a proton exchange membrane for solid polymer fuel cells.

COMPARATIVE EXAMPLE 2

A solution with a poly(p-phenylene-cis-benzobisoxazole) concentration of 0.4% by weight was prepared by diluting a dope comprising polyphosphoric acid containing 14% by weight of poly(p-phenylene-cis-benzobisoxazole) polymer having IV=24 dL/g by addition of methane sulfonic acid. This solution was formed into a film on a glass plate heated to 90° C. at a film formation rate of 5 mm/sec using an applicator with a clearance of 300 μm. The thus obtained dope film was solidified on the glass plate used in the film formation in a thermohygrostat at 25° C. and 80% RH for one hour. However, the resulting support membrane was difficult to be handled thereafter because of its low strength.

COMPARATIVE EXAMPLE 3

A solution with a poly(p-phenylene-cis-benzobisoxazole) concentration of 2.2% by weight was prepared by diluting a dope comprising polyphosphoric acid containing 14% by weight of poly(p-phenylene-cis-benzobisoxazole) polymer having IV=24 dL/g by addition of methane sulfonic acid. Despite an attempt to form this solution into a film on a glass plate heated to 90° C. at a film formation rate of 5 mm/sec using an applicator with a clearance of 300 μm, it was impossible to form a uniform film due to the high viscosity of the solution.

COMPARATIVE EXAMPLE 4

A solution with a poly(p-phenylene-cis-benzobisoxazole) concentration of 1% by weight was prepared by diluting a dope comprising polyphosphoric acid containing 14% by weight of poly(p-phenylene-cis-benzobisoxazole) polymer having IV=13 dL/g by addition of methane sulfonic acid. This solution was formed into a film on a glass plate heated to 90° C. at a film formation rate of 5 mm/sec using an applicator with a clearance of 300 Mm. The thus obtained dope film was solidified on the glass plate used in the film formation in a thermohygrostat at 25° C. and 80% RH for one hour. However, the resulting support membrane was difficult to be handled thereafter because of its low strength.

COMPARATIVE EXAMPLE 5

A solution with a poly(p-phenylene-cis-benzobisoxazole) concentration of 1% by weight was prepared by diluting a dope comprising polyphosphoric acid containing 14% by weight of poly(p-phenylene-cis-benzobisoxazole) polymer having IV=36 dL/g by addition of methane sulfonic acid. Despite an attempt to form this solution into a film on a glass plate heated to 90° C. at a film formation rate of 5 mm/sec using an applicator with a clearance of 300 Mm, it was impossible to form a uniform film due to the high viscosity of the solution.

COMPARATIVE EXAMPLE 6

A composite ion exchange membrane of Comparative Example 6 was prepared in the same way as that described in Example 4 except that a 15-minute solidification in ethylene glycol at 25° C. was conducted in place of the 1-hour solidification in a thermohygrostat at 25° C. and 80% RH. The measurement of the ionic conductivity of the composite ion exchange membrane of Comparative Example 6 was attempted. However, part of the ion exchange resin layers formed on both surfaced of the composite layer peeled under a high-temperature high-humidity atmosphere of 80° C. and 95% RH and therefore the ionic conductivity could not be determined.

COMPARATIVE EXAMPLE 7

A composite ion exchange membrane of Comparative Example 7 was prepared in the same way as that described in Example 1 except that when the support membrane immersed in the Nation (commercial name) solution was picked up from the solution, the Nation (commercial name) solution attaching to both surfaces of the support membrane was scraped off with a scraper so that the surfaces of the solution would lose their luster.

COMPARATIVE EXAMPLE 8

A composite ion exchange membrane of Comparative Example 8 was prepared in the same way as that described in Example 9 except that the clearance of the applicator in the film formation of the poly(p-phenylene-cis-benzobisoxazole) solution was changed to 600 μm. The composite ion exchange membrane prepared in this way had a thickness of 72 μm. The thickness of the composite layer was 70 μm, which accounted for 97% of the thickness of the membrane.

COMPARATIVE EXAMPLE 9

A composite ion exchange membrane of Comparative Example 9 was prepared in the same way as that described in Example 8 except that the clearance of the applicator in the film formation of the poly(p-phenylene-cis-benzobisoxazole) solution was changed to 30 μm. The composite ion exchange membrane prepared in this way had a thickness of 46 μm. The thickness of the composite layer was 2 μm, which accounted for 4% of the thickness of the membrane.

COMPARATIVE EXAMPLE 10

A solution with a poly(p-phenylene-cis-benzobisoxazole) concentration of 0.4% by weight was prepared by diluting a dope comprising polyphosphoric acid containing 14% by weight of poly(p-phenylene-cis-benzobisoxazole) polymer having IV=24 dL/g by addition of methane sulfonic acid. This solution was formed into a film on a glass plate heated to 90° C. at a film formation rate of 10 mm/sec using an applicator with a clearance of 300 μm. The thus obtained dope film was solidified on the glass plate used in the film formation in a thermohygrostat at 25° C. and 80% RH for one hour. However, the resulting support membrane was difficult to be handled thereafter because of its low strength.

COMPARATIVE EXAMPLE 11

A solution with a poly(p-phenylene-cis-benzobisoxazole) concentration of 2.2% by weight was prepared by diluting a dope comprising polyphosphoric acid containing 14% by weight of poly(p-phenylene-cis-benzobisoxazole) polymer having IV=24 dL/g by addition of methane sulfonic acid. Despite an attempt to form this solution into a film on a glass plate heated to 90° C. at a film formation rate of 10 mm/sec using an applicator with a clearance of 300 μm, it was impossible to form a uniform film due to the high viscosity of the solution.

COMPARATIVE EXAMPLE 12

A solution with a poly(p-phenylene-cis-benzobisoxazole) concentration of 1% by weight was prepared by diluting a dope comprising polyphosphoric acid containing 14% by weight of poly(p-phenylene-cis-benzobisoxazole) polymer having IV=13 dL/g by addition of methane sulfonic acid. This solution was formed into a film on a glass plate heated to 90° C. at a film formation rate of 10 mm/sec using an applicator with a clearance of 300 μm. The thus obtained dope film was solidified on the glass plate used in the film formation in a thermohygrostat at 25° C. and 80% RH for one hour. However, the resulting support membrane was difficult to be handled thereafter because of its low strength.

COMPARATIVE EXAMPLE 13

A solution with a poly(p-phenylene-cis-benzobisoxazole) concentration of 1% by weight was prepared by diluting a dope comprising polyphosphoric acid containing 14% by weight of poly(p-phenylene-cis-benzobisoxazole) polymer having IV=36 dL/g by addition of methane sulfonic acid. Despite an attempt to form this solution into a film on a glass plate heated to 90° C. at a film formation rate of 10 mm/sec using an applicator with a clearance of 300 μm, it was impossible to form a uniform film due to the high viscosity of the solution.

COMPARATIVE EXAMPLE 14

A composite ion exchange membrane of Comparative Example 14 was prepared in the same way as that described in Example 11 except that a 15-minute solidification in ethylene glycol at 25° C. was conducted in place of the 1-hour solidification in a thermohygrostat at 25° C. and 80% RH. The measurement of the ionic conductivity of the composite ion exchange membrane of Comparative Example 14 was attempted. However, part of the ion exchange resin layers formed on both surfaced of the composite layer peeled under a high-temperature high-humidity atmosphere of 80° C. and 95% RH and therefore the ionic conductivity could not be determined.

COMPARATIVE EXAMPLE 15

A composite ion exchange membrane of Comparative Example 15 was prepared in the same way as that described in Example 8 except that when the support membrane immersed in the Nation solution was picked up from the solution, the Nation solution attaching to both surfaces of the support membrane was scraped off with a scraper so that the surfaces of the solution would lose their luster.

COMPARATIVE EXAMPLE 16

A composite ion exchange membrane of Comparative Example 16 was prepared in the same way as that described in Example 16 except that when the support membrane immersed in the Nation solution was removed from the solution, the Nation solution attaching to both surfaces of the support membrane was scraped off with a scraper made of polytetrafluoroethylene so that the surfaces of the support membrane would be exposed.

COMPARATIVE EXAMPLE 17

A composite ion exchange membrane of Comparative Example 17 was prepared in the same way as that described in Example 16 except that after the volatilization of the solvent in the Nation solution which permeated into the support membrane or attached to the surface of the support membrane to dry by air-drying but before the heat treatment, a step of immersing the support membrane in a 20% Nation solution at 25° C. for one minute followed by its removal further followed by volatilizing the solvent in the Nation solution to dry by air-drying was added delicately.

COMPARATIVE EXAMPLE 18

Using an isotropic solution having a polyparaphenylene-cis-benzobisoxazole concentration of 1% by weight the same as that used in Example 16, a film was formed from this solution on a glass plate heated to 90° C. at a film formation rate of 5 mm/sec using an applicator with a clearance of 200 μm. The dope film formed on the glass plate was placed as it was in a thermohygrostat at 25° C. and 80% RH and was solidified for one hour. The resulting film was washed with water until the washings exhibited pH 7±0.5, yielding a support membrane. This support membrane was fixed to a stainless steel frame in water and was immersed in a solution at 25° C. for 15 hours, the solution being adjusted to have a Nafion (commercial name) concentration of 5% by weight by diluting a 10% Nafion (commercial name) solution (product number: SE-10192) by addition of purified water. Then, the film was removed from the solution and the solvent of the Nafion solution which permeated into the membrane or attached to the surface of the membrane was volatilized to dry by air-drying. Moreover, a process including immersing the film at 25° C. for one minute in a 20% Nafion (commercial name) solution (product number: SE-20192) manufactured by DuPont, removing it and volatilizing the solvent of the Nafion solution to dry by air-drying was repeated twice. Then, the resultant was preheated for one hour in an oven at 60° C. for removal of the remaining solvent and then was subjected to heat treatment for one hour at 150° C. under nitrogen atmosphere. Thus, a composite ion exchange membrane of Comparative Example 18 was prepared.

COMPARATIVE EXAMPLE 19

A composite ion exchange membrane of Comparative Example 19 was prepared in the same way as that described in Example 19 except that a 15-minute solidification in ethylene glycol at 25° C. was conducted in place of the 1-hour solidification in a thermohygrostat at 25° C. and 80% RH. The measurement of the ionic conductivity of the composite ion exchange membrane of Comparative Example 19 was attempted under atmosphere of 80° C. and 95% RH. However, part of the surface layers peeled with the absorption of moisture by the composite ion exchange membrane and therefore the ionic conductivity could not be determined.

COMPARATIVE EXAMPLE 20

An isotropic solution with a poly(p-phenylene-cis-benzobisoxazole) concentration of 0.4% by weight was prepared by diluting a dope comprising polyphosphoric acid containing 14% by weight of poly(p-phenylene-cis-benzobisoxazole) polymer having IV=24 dL/g by addition of methane sulfonic acid. This solution was formed into a film on a glass plate heated to 90° C. at a film formation rate of 5 mm/sec using an applicator with a clearance of 300 μm. The thus obtained dope film was solidified on the glass plate used in the film formation in a thermohygrostat at 25° C. and 80% RH for one hour. However, the resulting support membrane was difficult to be handled thereafter because of its low strength.

COMPARATIVE EXAMPLE 21

A solution with a poly(p-phenylene-cis-benzobisoxazole) concentration of 2.2% by weight was prepared by diluting a dope comprising polyphosphoric acid containing 14% by weight of poly(p-phenylene-cis-benzobisoxazole) polymer having IV=24 dL/g by addition of methane sulfonic acid. Despite an attempt to form this solution into a film on a glass plate heated to 90° C. at a film formation rate of 5 mm/sec using an applicator with a clearance of 300 μm, it was impossible to form a uniform film due to the high viscosity of the solution.

COMPARATIVE EXAMPLE 22

A composite ion exchange membrane of Comparative Example 22 was prepared in the same way as that described in Example 21 except that a 15-minute solidification in ethylene glycol at 25° C. was conducted in place of the 1-hour solidification in a thermohygrostat at 25° C. and 80% RH. The measurement of the ionic conductivity of the composite ion exchange membrane of Comparative Example 22 was attempted under atmosphere of 80° C. and 95% RH. However, part of the surface layers peeled with the absorption of moisture by the composite ion exchange membrane and therefore the ionic conductivity could not be determined.

COMPARATIVE EXAMPLE 23

A composite ion exchange membrane of Comparative Example 23 was prepared in the same way as that described in Example 23 except that when the support membrane immersed in the Nafion solution was removed from the solution, the Nafion solution attaching to both surfaces of the support membrane was scraped off with a scraper made of Teflon (commercial name) so that the surfaces of the support membrane would be exposed.

COMPARATIVE EXAMPLE 24

A composite ion exchange membrane of Comparative Example 24 was prepared in the same way as that described in Example 24 except that after the volatilization of the solvent in the Nafion solution which permeated into the support membrane or attached to the surface of the support membrane to dry by air-drying but before the heat treatment, a step of immersing the support membrane in a 20% Nafion solution at 25° C for one minute followed by its removal further followed by volatilizing the solvent in the Nafion solution to dry by air-drying was added delicately.

COMPARATIVE EXAMPLE 25

A drawn porous PTFE sheet having a thickness of 20 μm and a porosity of 89% was fixed in a stainless steel frame and was immersed in a 20% Nafion (commercial name) solution at 25° C. for 15 hours. It was then removed from the solution and the solvent in the Nafion (commercial name) solution which permeated into the membrane or attached to the surface of the membrane was volatilized to dry by air-drying. The impregnation/air-drying was repeated five times to form a membrane in which the pores and the surfaces of the drawn porous PTFE membrane were filled with Nafion (commercial name) resin. The dried membrane was preheated for one hour in an oven at 60° C. for removal of the remaining solvent and then was subjected to heat treatment for one hour at 150° C. under nitrogen atmosphere. Thus, an ion exchange membrane of Comparative Example 25 was prepared.

COMPARATIVE EXAMPLE 26

An ion exchange membrane with electrode catalyst layers was formed in the same way as that described in Example 26 using a commercially-available Nafion 112 (commercial name) membrane manufactured by Du Pont as an ion exchange membrane in place of the composite ion exchange layer. This ion exchange membrane with electrode catalyst layers was swollen to deform into a wavy form. The aforementioned ion exchange membrane with electrode catalyst layers was sandwiched between two sheets of carbon paper TGPH-060 manufactured by Toray Industries, Inc. Subsequently, they were applied with pressure and heat at 120° C. and 2 MPa for three minutes by hot pressing, yielding an electrolyte-electrode assembly of Comparative Example 25. In this assembly, since the membrane deformed to wave, bonding was achieved imperfectly.

COMPARATIVE EXAMPLE 27

An electrolyte-electrode assembly of Comparative Example 26 was prepared in the same way as that described in Example 25 except that when the support membrane immersed in the Nafion solution was removed from the solution, the Nafion solution attaching to both surfaces of the support membrane was scraped off with a scraper made of polytetrafluoroethylene so that the surfaces of the support membrane would be exposed. When the support membranes used in Examples 1 to 26 before being combined with ion exchange resin were critical point dried in the way described in the Examples. The observation of their surface structure by SEM confirmed that the support membranes had open pores defined by a network structure of fibril-like fibers. In FIG. 1, one example of an open pore structure in a surface of a support membrane is shown using a schematic view.

Table 1 summarizes the characteristics and the effects of the composite ion exchange membranes or the electrolyte membrane-electrode assemblies obtained in Examples 1 to 25, Comparative Example 1 and Comparative Examples 2 to 27.

As shown in Examples 1 to 25 and 28, it is seen that if the concentration of the dope used in the production of support membranes falls within the range of from 0.5 to 2.0% by weight, a support membrane which is uniform and has a strength sufficient to be handled can be obtained. In addition, when a dope having a concentration within such a range is formed into a film and solidified, a porous support membrane having a surface open area ratio of 40% or more can be obtained by a method comprising solidifying the film for a short time of 3 minutes under a steam-containing atmosphere with a relative humidity of 80% at 25° C. and then completing the solidification with water as well as a method comprising solidifying the film for 60 minutes under a steam-containing atmosphere with a relative humidity of 80% at 25° C.

As shown in Comparative Examples 2, 3, 10, 11, 20 and 21, it is seen that if a support membrane is produced at a dope concentration out of the range of from 0.5 to 2.0% by weight, there arise problems that no support membrane having a sufficient strength can be obtained or uniform film formation can not be achieved. On the other hand, as shown in Comparative Examples 14, 19 and 22, it is seen that when an ethylene glycol bath is used as a solidification bath for solidifying a support membrane, a phenomena such as small surface open area ratio are observed and no favorable support membrane can be obtained.

As shown in Comparative Examples 7, 16, 23 and 27, it is seen that in a composite ion exchange membrane which is designed such that no ion exchange resin layer is formed on a surface of a support layer by scraping off an ion exchange resin solution adhering to the surface when the ion exchange resin is combined with the support membrane, part of the support is exposed in a surface and therefore, when a catalyst layer is bonded, the adhesion of the catalyst layer is affected, resulting in problems of delamination of the catalyst layer and exhibition of low electric power generation characteristics.

It is seen that the composite ion exchange membranes provided in the Examples of the present invention exhibit improved durabilities, such as greater tensile elongations, smaller creep elongations and smaller dimensional changes when containing water, in comparison with the Nafion 112 (commercial name) membrane of Comparative Example 1 which contains no support membrane. Moreover, it is seen, as shown in Examples 1 to 20, that the composite ion exchange membranes of the present invention exhibit significantly small values of gas permeability in comparison with Comparative Example 1 and therefore they are ion exchange membranes superior in fuel permeation inhibitability. Furthermore, it is seen that despite containing supports, the composite ion exchange membranes provided in the examples of the present invention do not exhibit significant deterioration in ionic conductivity or generation performance in comparison with Comparative Example 1 containing no support.

From the features shown above, the composite ion exchange membrane of the present invention possesses excellent characteristics as a polymer electrolyte membrane for fuel cells.

EXPLANATION OF REFERENCE NUMERALS

Figure 1:
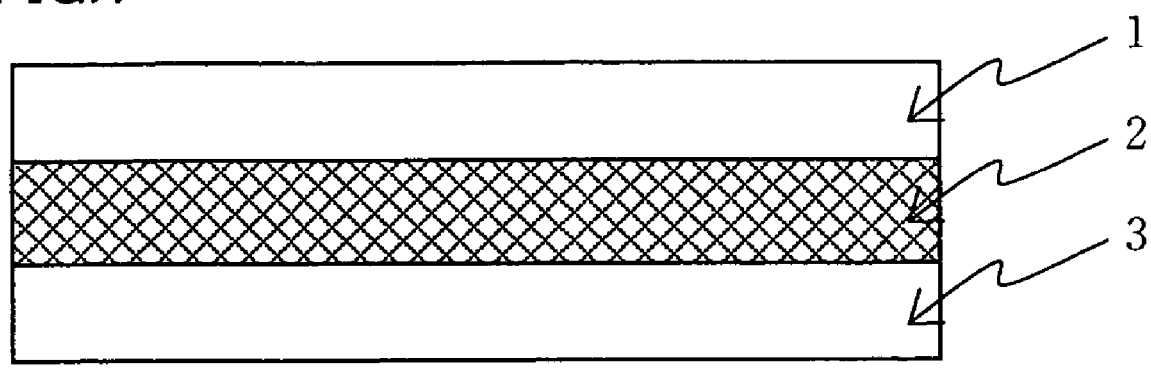
FIG. 1 is a schematic view of a sectional structure of a composite ion exchange membrane.
Figure 2:
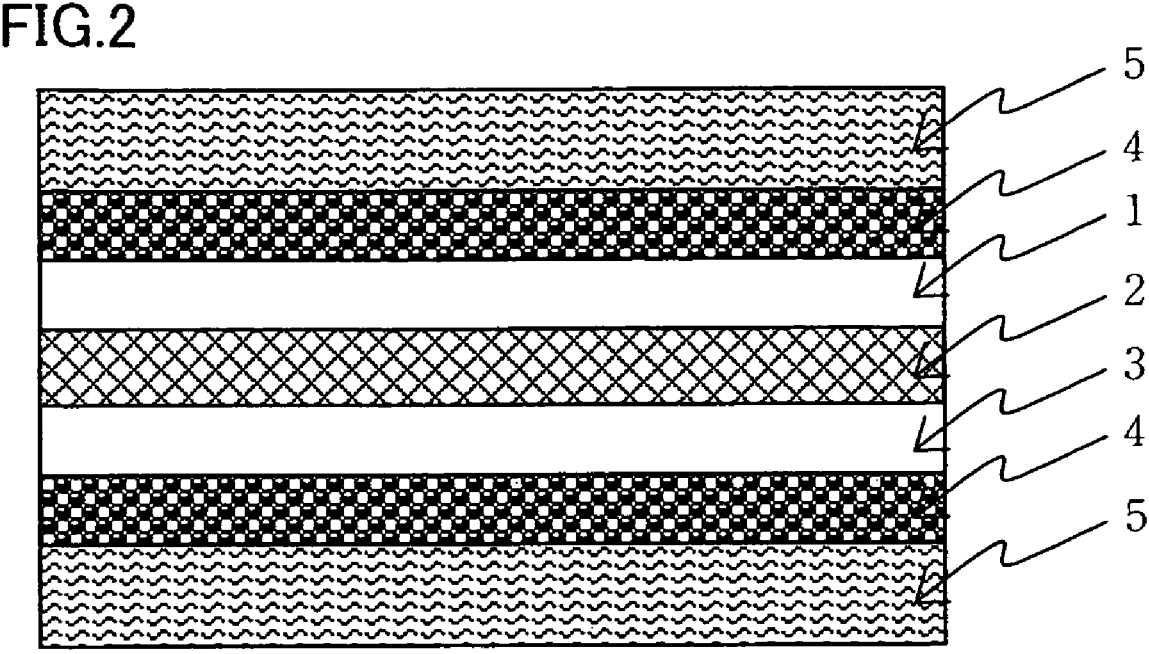
FIG. 2 is a schematic view of a sectional structure of a composite ion exchange membrane on which catalyst layers are bonded.
Figure 3:
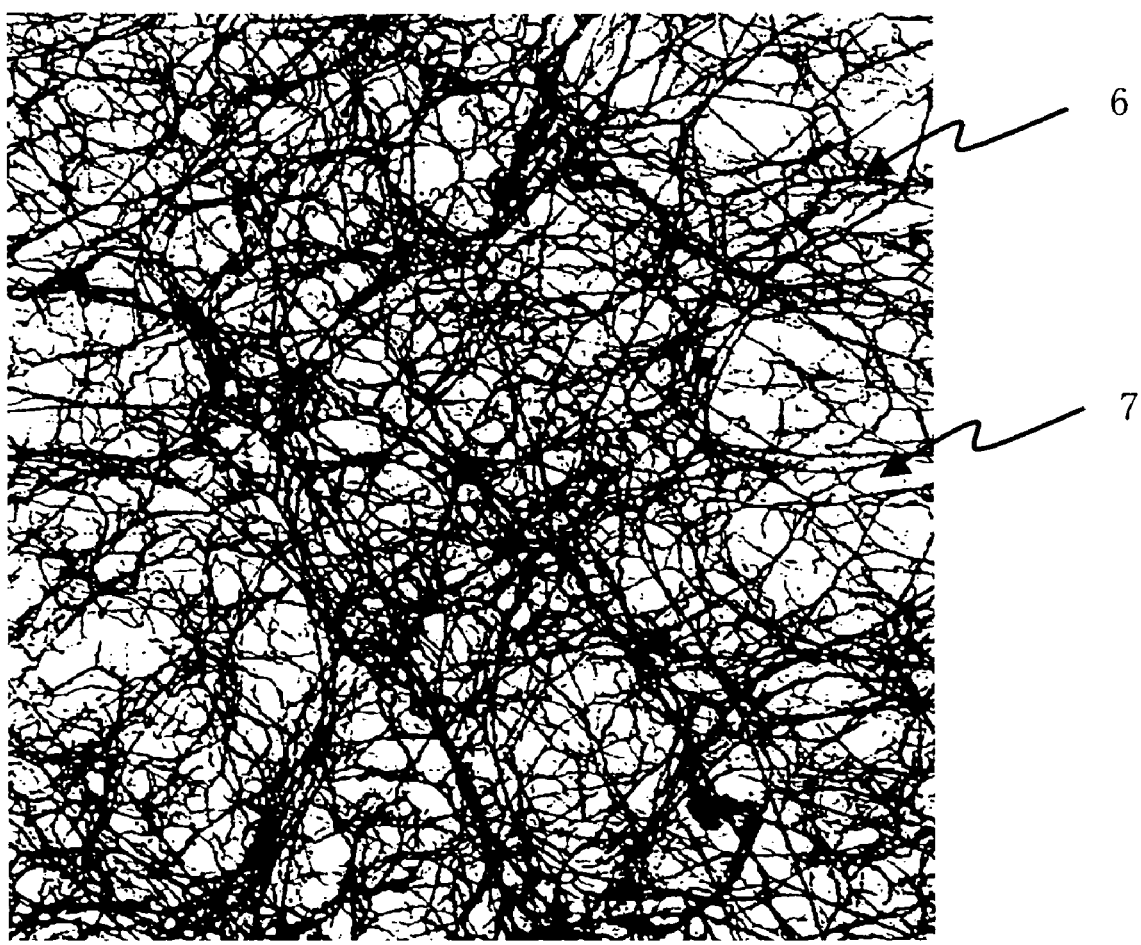
FIG. 3 is a schematic view of an image obtained by critical point drying a support membrane before being combined with ion exchange resin and then observing a surface of the support membrane by a scanning electron microscope.

1 Surface layer A, 2 Composite layer 3 Surface layer B,
4 Catalyst layer, 5 Gas diffusion layer,
6 Fibril of support membrane, 7 Void Industrial Applicability It is possible to offer an electrolyte membrane-electrode assembly that includes a solid polymer electrolyte membrane which has high mechanical strength and which is superior in ionic conductivity, electric power generation characteristic and gas barrier property and that exhibits good adhesion between the electrolyte membrane and the electrode assembly.

TABLE 1

| | Thickness of support μm | Surface open area ratio of support % | Porosity of support % | Total thickness of composite ion exchange membrane μm | Thickness of composite layer | Composite layer thickness/ Total membrane thickness | Surface ICP layer thickness A μm | Surface ICP layer thickness B μm | ICP content % by weight | Ionic conductivity S/cm | Breaking strength MPa |
|---|---|---|---|---|---|---|---|---|---|---|---|
| Example 1 | 90 | 69 | 98 | 50 | | | 15 | | 95 | 0.19 | 27 |
| Example 2 | 90 | 69 | 98 | 21 | | | 5 | | 89 | 0.16 | 41 |
| Example 3 | 90 | 69 | 98 | 50 | | | 15 | | 95 | 0.22 | 26 |
| Example 4 | 90 | 69 | 98 | 21 | | | 5 | | 89 | 0.19 | 39 |
| Example 5 | 55 | 54 | 96 | 21 | | | 4 | | 85 | 0.17 | 65 |
| Example 6 | 90 | 68 | 98 | 20 | | | 4 | | 84 | 0.17 | 43 |
| Example 7 | 105 | 44 | 97 | 52 | | | 12 | | 98 | 0.17 | 38 |
| Example 8 | 90 | 69 | 97 | 50 | 20 | 40 | | | 98 | 0.19 | 27 |
| Example 9 | 90 | 69 | 97 | 21 | 11 | 52 | | | 89 | 0.16 | 41 |
| Example 10 | 177 | 69 | 97 | 68 | 62 | 91 | | | 86 | 0.17 | 53 |
| Example 11 | 90 | 69 | 97 | 50 | 20 | 40 | | | 95 | 0.22 | 26 |
| Example 12 | 90 | 69 | 98 | 21 | 11 | 52 | | | 89 | 0.19 | 39 |
| Example 13 | 55 | 54 | 96 | 21 | 13 | 62 | | | 85 | 0.17 | 65 |
| Example 14 | 90 | 68 | 98 | 20 | 12 | 60 | | | 84 | 0.17 | 43 |
| Example 15 | 105 | 44 | 97 | 52 | 28 | 54 | | | 95 | 0.17 | 38 |
| Example 16 | | 69 | | 50 | 19 | | 17 | 14 | 95 | 0.19 | 28 |
| Example 17 | | 69 | | 21 | 11 | | 5 | 5 | 89 | 0.16 | 41 |
| Example 18 | | 69 | | 50 | 19 | | 16 | 15 | 95 | 0.22 | 24 |
| Example 19 | | 69 | | 21 | 11 | | 5 | 5 | 89 | 0.19 | 39 |
| Example 20 | | 44 | | 52 | 28 | | 12 | 12 | 95 | 0.17 | 38 |
| Example 21 | | 69 | | 50 | 19 | | 17 | 14 | 95 | 0.19 | 28 |
| Example 22 | | 44 | | 52 | 28 | | 12 | 12 | 95 | 0.17 | 36 |
| Example 23 | | 69 | | 48 | 18 | | 16 | 14 | 93 | 0.19 | 29 |
| Example 24 | | 69 | | 18 | 10 | | 4 | 4 | 87 | 0.16 | 44 |
| Example 25 | 48 | | | 48 | | | | | | 0.19 | |
| Example 26 | | | | 48 | 19 | | 16 | 13 | 94 | 0.19 | 28 |
| Example 27 | | | | 48 | 19 | | 16 | 13 | 94 | 0.18 | 28 |
| Example 28 | 113 | 51 | | 54 | 30 | | 13 | 11 | 93 | 0.18 | 32 |

| | Tensile modulus MPa | Creep elongation % | High-temperature creep elongation % | Creep elongation in high temperature water % | Dimensional change in length % | Dimensional change in width % | Gas permeability Cm²·cm/ cm²·s·MPa | Electrode adhesion — | Generation performance |
|---|---|---|---|---|---|---|---|---|---|
| Example 1 | 716 | 28 | | | | | 1.6 × 10⁻⁶ | Good | |
| Example 2 | 1429 | 25 | | | | | 1.6 × 10⁻⁶ | Good | |
| Example 3 | 766 | 25 | | | | | 1.4 × 10⁻⁶ | Good | |
| Example 4 | 1406 | 22 | | | | | 1.4 × 10⁻⁶ | Good | |

TABLE 1-continued

| | Thickness of support μm | Surface open area ratio of support % | Porosity of support % | Total thickness of composite ion exchange membrane μm | Thickness of composite layer | Composite layer thickness/Total membrane thickness | Surface ICP layer thickness A μm | Surface ICP layer thickness B μm | ICP content % by weight | Ionic conductivity S/cm | Breaking strength MPa |
|---|---|---|---|---|---|---|---|---|---|---|---|
| Example 5 | 2545 | 21 | | | | | | | | $1.2 \times 10^{-6}$ | Good |
| Example 6 | 2205 | 23 | | | | | | | | $1.4 \times 10^{-6}$ | Good |
| Example 7 | 1220 | 15 | | | | | | | | $1.4 \times 10^{-6}$ | Good |
| Example 8 | 716 | 28 | | | | | | | | $1.6 \times 10^{-6}$ | Good |
| Example 9 | 1429 | 25 | | | | | | | | $1.6 \times 10^{-6}$ | Good |
| Example 10 | 2520 | 20 | | | | | | | | $1.2 \times 10^{-6}$ | Good |
| Example 11 | 766 | 25 | | | | | | | | $1.4 \times 10^{-6}$ | Good |
| Example 12 | 1406 | 22 | | | | | | | | $1.4 \times 10^{-6}$ | Good |
| Example 13 | 2545 | 21 | | | | | | | | $1.2 \times 10^{-6}$ | Good |
| Example 14 | 2205 | 23 | | | | | | | | $1.4 \times 10^{-6}$ | Good |
| Example 15 | 1220 | 15 | | | | | | | | $1.4 \times 10^{-6}$ | Good |
| Example 16 | 718 | | | | | | | | | $1.6 \times 10^{-6}$ | 0.7 |
| Example 17 | 1429 | | | | | | | | | $1.6 \times 10^{-6}$ | 0.7 |
| Example 18 | 766 | | | | | | | | | $1.4 \times 10^{-6}$ | 0.7 |
| Example 19 | 1406 | | | | | | | | | $1.4 \times 10^{-6}$ | 0.75 |
| Example 20 | 1220 | | | | | | | | | $1.4 \times 10^{-6}$ | 0.7 |
| Example 21 | 699 | | | | | | | | | | | 0.7 |
| Example 22 | 1188 | | | | | | | | | | | 0.7 |
| Example 23 | 722 | | | | | | 0 | 0.5 | | | |
| Example 24 | 1542 | | | | | | 0.2 | 0 | | | |
| Example 25 | | | | | 2 | 12 | | | | | |
| Example 26 | 724 | | | | | | | | | $1.6 \times 10^{-6}$ | 0.7 |
| Example 27 | 724 | | | | | | | | | $1.6 \times 10^{-6}$ | 0.6 |
| Example 28 | 922 | | | | | | | | | | | |

ICP: Ion exchange resin

TABLE 2

| | Thickness of support μm | Surface open area ratio of support % | Porosity of support % | Total thickness of composite ion exchange membrane μm | Thickness of composite layer | Composite layer thickness/Total membrane thickness | Surface ICP layer thickness A μm | Surface ICP layer thickness B μm | ICP content % by weight | Ionic conductivity S/cm | Breaking strength MPa |
|---|---|---|---|---|---|---|---|---|---|---|---|
| Comparative Example 1 | No support | | | 49 | | No support | | | 100 | 0.2 | 22 |
| Comparative Example 6 | 75 | 16 | 82 | 19 | | | 4 | | | Undeterminable | |
| Comparative Example 7 | 90 | 69 | 98 | 15 | | | 0 | | 62 | 0.12 | |
| Comparative Example 8 | 171 | 69 | 98 | 72 | 70 | 97 | | | 85 | 0.18 | 55 |
| Comparative Example 9 | 10 | 68 | 98 | 45 | 2 | 4 | | | 98 | 0.20 | 20 |
| Comparative Example 14 | 75 | 16 | 82 | 19 | 11 | 58 | | | | Undeterminable | |
| Comparative Example 15 | 90 | 69 | 98 | 15 | 15 | 100 | | | 62 | 0.12 | |
| Comparative Example 16 | | 69 | | 25 | 25 | | 0 | 0 | 46 | 0.04 | 144 |
| Comparative Example 17 | | 69 | | 139 | 20 | | 61 | 58 | 98 | 0.19 | 25 |
| Comparative Example 18 | | 64 | | 99 | 4 | | 48 | 47 | 98 | 0.19 | 25 |
| Comparative Example 19 | | 16 | | 19 | 11 | | 4 | 4 | 72 | Undeterminable | |
| Comparative Example 22 | | 16 | | 19 | 11 | | 4 | 4 | 72 | Undeterminable | |
| Comparative Example 23 | | 69 | | 22 | 22 | 100 | 0 | 0 | 44 | 0.04 | 15 |
| Comparative Example 24 | | 69 | | 137 | 20 | 15 | 60 | 57 | 95 | 0.19 | 22 |
| Comparative | | | | 42 | | | | | | 0.16 | |

TABLE 2-continued

| | Tensile modulus MPa | Creep elongation % | High-temperature creep elongation % | Creep elongation in high temperature water % | Dimensional change in length % | Dimensional change in width % | Gas permeability $Cm^2 \cdot cm/cm^2 \cdot s \cdot MPa$ | Electrode adhesion | Generation performance |
|---|---|---|---|---|---|---|---|---|---|
| Example 25 | | | 50 | | No support | | 100 | 0.2 | 22 |
| Comparative Example 26 | | | | | | | | | |
| Comparative Example 27 | | 24 | 24 | | 0 | 0 | 43 | 0.04 | 146 |
| Comparative Example 1 | 315 | 150 | 200 | 284 | −7 | 26 | $3.6 \times 10^{-6}$ | Good | 0.8 |
| Comparative Example 6 | | | | | | | | | |
| Comparative Example 7 | | | | | | | | | Delaminated |
| Comparative Example 8 | 2662 | 19 | | | | | | Delaminated | |
| Comparative Example 9 | 334 | 34 | | | | | | Good | |
| Comparative Example 14 | | | | | | | | | |
| Comparative Example 15 | | | | | | | | Delaminated | |
| Comparative Example 16 | 2825 | | | | | | | | 0.2 |
| Comparative Example 17 | 402 | | | | | | | Surface ICP layer delaminated. Undeterminable | |
| Comparative Example 18 | 488 | | | | | | | Surface ICP layer delaminated. Undeterminable | |
| Comparative Example 19 | | | | | | | | | |
| Comparative Example 22 | | | | | | | | | |
| Comparative Example 23 | 2883 | | | | −0.1 | −0.1 | | Delaminated | |
| Comparative Example 24 | 402 | | | | 0.7 | 1 | | | |
| Comparative Example 25 | | | 72 | 85 | | | | | |
| Comparative Example 26 | 317 | | | | | | $3.6 \times 10^{-6}$ | Delaminated | 0.5 |
| Comparative Example 27 | 3011 | | | | | | $2.0 \times 10^{-6}$ | Delaminated | 0.2 |

ICP: Ion exchange resin

The invention claimed is:

1. A composite ion exchange membrane including a composite layer comprising a support membrane with continuous voids formed of polybenzazole polymer, the support layer being impregnated with ion exchange resin, and surface layers formed of ion exchange resin free of support membranes, the surface layers being formed on both surfaces of the composite layer so as to sandwich the composite layer therebetween,
   wherein the thickness of the composite layer accounts for from 5% to 95% of the total thickness of the composite ion exchange membrane,
   wherein each of the surface layers has a thickness of from 1 μm to 50 μm and does not exceed half the total thickness of the composite ion exchange membrane, and further
   wherein the porosity of the support membrane is 90% by volume or more.

2. A composite ion exchange membrane according to claim 1 wherein at least one surface of the support membrane has an open area ratio of 40% or more.

3. The composite ion exchange membrane according to claim 1, wherein the dimensional change, based on the length of each side of a dry composite ion exchange membrane cut into a square in an arbitrary direction in a membrane surface, of each corresponding side of the composite ion exchange membrane impregnated with water through its 24-hour immersion in purified water at 80° C. is within the range between a 5% decrease and a 10% increase.

4. The composite ion exchange membrane according to claim 1, wherein the conposite ion exchange membrane exhibits a high-temperature creep eolngation of up to 50% when it is applied with a load of 1 Mpa for two hours under a dry atmosphere at 130°.

5. The composite ion exchange membrane according to claim 1, wherein the composite ion exchange membrane exhibits a creep elongation in high temperature water of up to 60% when it is applied with a load of 1 MPa for two hours in water at 130° C.

6. A method for producing the support membrane formed of polybenzazole polymer in the composite ion exchange membrane according to claim 1, the method comprising forming a polybenzazole polymer solution into a film form and then solidifying it, wherein the polybenzazole polymer solution is an isotropic solution containing the polybenzazole polymer in an amount of from 0.5% by weight to 2% by weight.

7. An electrolyte membrane-electrode assembly comprising the composite ion exchange membrane according to claim 1, wherein catalyst layers and gas diffusion layers are disposed on both surfaces of the composite ion exchange membrane.

8. The electrolyte membrane-electrode assembly according to claim 7, wherein each of the surface layers formed of ion exchange resin free of support membranes, the surface layers being formed on both surfaces, has a thickness of from 1 μm to 50μm and does not exceed half the total thickness of the composite ion exchange membrane.

9. The electrolyte membrane-electrode assembly according to Claim 7, wherein at least one surface of the support membrane has an open area ratio of 40% or more.

10. A fuel cell using the electrolyte membrane-electrode assembly according to claim 7.

11. The composite ion exchange membrane according to claim 2, wherein the dimensional change, based on the length of each side of a dry composite ion exchange membrane cut into a square in an arbitrary direction in a membrane surface, of each corresponding side of the composite ion exchange membrane impregnated with water through its 24-hour immersion in purified water at 80° C. is within the range between a 5% decrease and a 10% increase.

12. The composite ion exchange membrane according to claim 2, wherein the composite ion exchange membrane exhibits a high-temperature creep elongation of up to 50% when it is applied with a load of 1 MPa for two hours under a dry atmosphere at 130° C.

13. The composite ion exchange membrane according to claim 2, wherein the composite ion exchange membrane exhibits a creep elongation in high temperature water of up to 60% when it is applied with a load of 1 MPa for two hours in water at 130° C.

14. A method for producing the support membrane formed of polybenzazole polymer in the composite ion exchange membrane according to claim 2, the method comprising forming a polybenzazole polymer solution into a film form and then solidifying it, wherein the polybenzazole polymer solution is an isotropic solution containing the polybenzazole polymer in an amount of from 0.5% by weight to 2% by weight.

15. The composite ion exchange membrane according to claim 1, wherein the porosity of the support membrane is 95% by volume or more.

* * * * *